United States Patent
Ando

(10) Patent No.: US 9,522,331 B2
(45) Date of Patent: Dec. 20, 2016

(54) GAME CONTROL METHOD, COMPUTER, AND COMPUTER-READABLE, NON-TRANSITORY MEDIUM

(71) Applicant: GREE, Inc., Minato-ku, Tokyo (JP)

(72) Inventor: Kazuko Ando, Minato-ku (JP)

(73) Assignee: GREE, INC., Minato-ku (JP)

( * ) Notice: Subject to any disclaimer, the term of this patent is extended or adjusted under 35 U.S.C. 154(b) by 0 days.

(21) Appl. No.: 14/557,063

(22) Filed: Dec. 1, 2014

(65) Prior Publication Data

US 2015/0157941 A1  Jun. 11, 2015

(30) Foreign Application Priority Data

Dec. 9, 2013  (JP) .................. 2013-254248
Jul. 8, 2014  (JP) .................. 2014-140783

(51) Int. Cl.
*A63F 13/00* (2014.01)
*A63F 13/58* (2014.01)
*A63F 13/822* (2014.01)

(52) U.S. Cl.
CPC .............. *A63F 13/58* (2014.09); *A63F 13/822* (2014.09)

(58) Field of Classification Search
CPC .......... A63F 13/42; A63F 13/50; A63F 13/55; A63F 13/58; A63F 2300/5546; A63F 2300/558; A63F 2300/6045; A63F 2300/6054; A63F 2300/609; A63F 2300/64

See application file for complete search history.

(56) References Cited

U.S. PATENT DOCUMENTS

| 6,306,033 | B1 * | 10/2001 | Niwa | A63F 13/10 463/1 |
| 6,354,940 | B1 * | 3/2002 | Itou | A63F 13/10 463/29 |
| 6,786,825 | B2 * | 9/2004 | Kawazu | A63F 13/10 463/43 |
| 8,469,819 | B2 * | 6/2013 | McMain | A63F 13/10 463/1 |
| 2007/0019243 | A1 | 1/2007 | Sato et al. | |
| 2007/0265047 | A1 * | 11/2007 | Nomura | A63F 13/00 463/8 |

(Continued)

FOREIGN PATENT DOCUMENTS

JP  2013-230229  11/2013
JP  2014-217732 A  11/2014

OTHER PUBLICATIONS

Items (gaming)—Wikipedia article, downloaded on Mar. 20, 2016.*

(Continued)

*Primary Examiner* — James S McClellan
(74) *Attorney, Agent, or Firm* — Lewis Roca Rothgerber Christie LLP

(57) ABSTRACT

A game control method used in a computer executing a game, includes storing a possessed point possessed by a player for executing an event in the game and a recovery point or a recovery item possessed by the player for recovering the possessed point, executing the event under a condition where the possessed point is at least a predetermined value and consuming the predetermined value from the possessed point, and automatically recovering the possessed point using the recovery point or the recovery item when the possessed point is less than the predetermined value.

14 Claims, 18 Drawing Sheets

(56) References Cited

U.S. PATENT DOCUMENTS

2007/0265063 A1* 11/2007 McNally .............. A63F 13/12
463/23
2013/0288762 A1 10/2013 Yoshie

OTHER PUBLICATIONS

Power-ups—Wikipedia article, downloaded on Mar. 20, 2016.*
Office action mailed Dec. 8, 2015 for corresponding JP Patent Application No. 2014-140783 including English translation, 8pp.
Notice of Reasons for Rejection mailed Feb. 4, 2014 for corresponding JP 2013-254248 including English translation, 7pp.
Decision of Final Rejection mailed May 13, 2014 for corresponding JP 2013-254248 including English translation, 5pp.
No106_in_japan, "A pet fills up HPMP medicine in Maplestory," Yahoo! Chiebukuro, [online], Solved on Mar. 6, 2008, [Searched on Jan. 27, 2014], <URL http://detail.chiebukuro.yahoo.co.jp/qa/question_detail/q1314989123>, pub. Feb. 24, 2008, 4pp.
"How to recover a pet with a HP/MP recovery function", "Maplestory", [online], [Search of Jan. 27, 2014], <URL, http://maplestory.nexon.co.jp/support/faq/view.asp?no=90&strSearchWord=>, printed Dec. 24, 2014, 3pp.
"Singularity: Singularity", Japan, Square Enix, Inc., Sep. 24, 2010, pp. 1 to 21 (refer to p. 13 in particular), Acceptance by Japanese independent administrative agency "National Center for Industrial Property Information and Training", 14pp.

* cited by examiner

FIG. 4A

| PLAYER ID | PASSWORD | NAME | IMAGE | GROUP ID | USED CARD ID | BATTLE POINT | AUTOMATIC RECOVERY SETTING | RECOVERY ITEM (ITEM NAME, POSSESSED NUMBER, AUTOMATICALLY USABLE NUMBER, USED NUMBER) | RECOVERY POINT (POSSESSED VALUE, AUTOMATICALLY USABLE VALUE, USED VALUE) | NUMBER OF TIMES OF AUTOMATIC RECOVERIES |
|---|---|---|---|---|---|---|---|---|---|---|
| 1 | xxxx | USER a | u_a.jpg | 1 | 1 | 10 | VALID | (RECOVERY MEDICINE A, 10, 3, 0), (RECOVERY MEDICINE B, 10, 3, 0), ... | (300, 100, 0) | 2 |
| ... | ... | ... | ... | ... | ... | ... | ... | ... | ... | ... |

FIG. 4B

| CARD ID | NAME | IMAGE | CONSUMPTION POINT NUMBER | ATTACK POWER | VITAL POWER |
|---|---|---|---|---|---|
| 1 | CARD a | g_a.jpg | 10 | 100 | 500 |
| ... | ... | ... | ... | ... | ... |

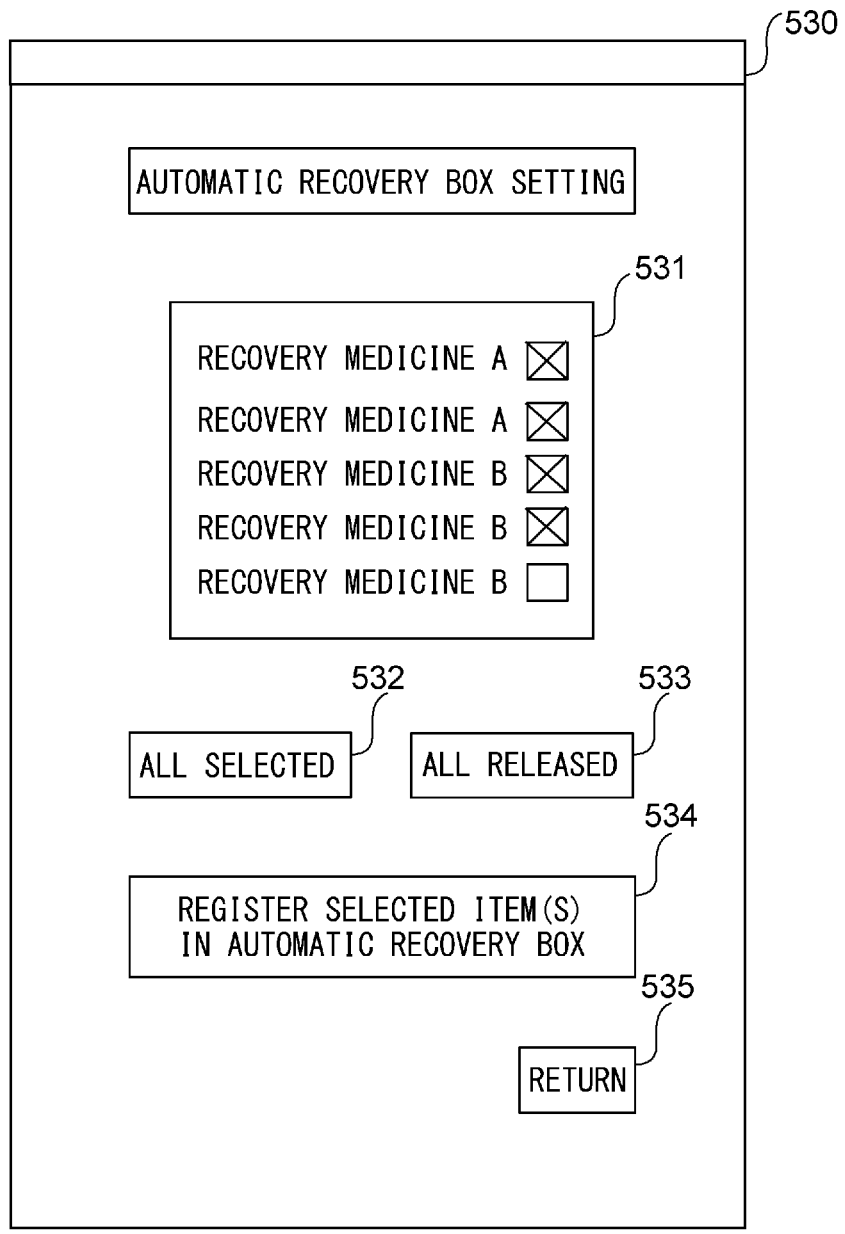

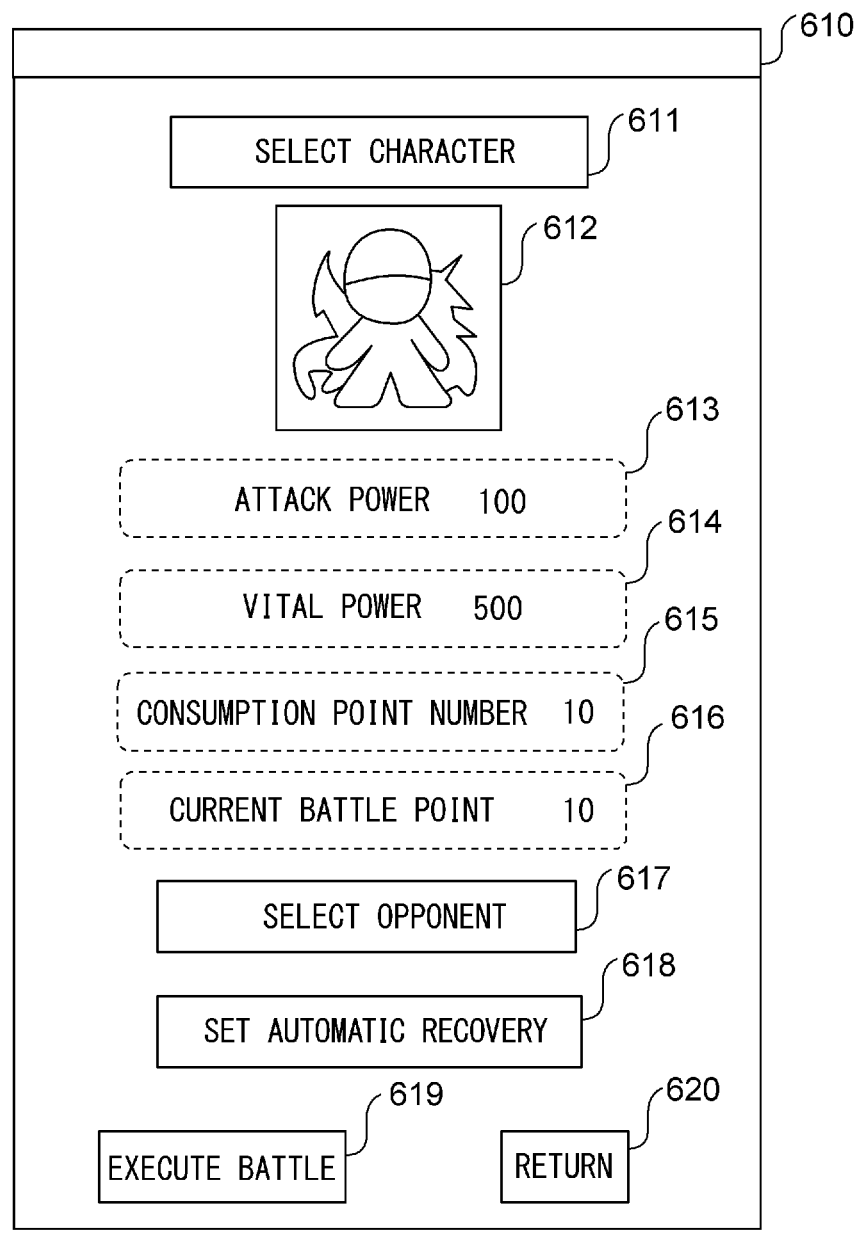

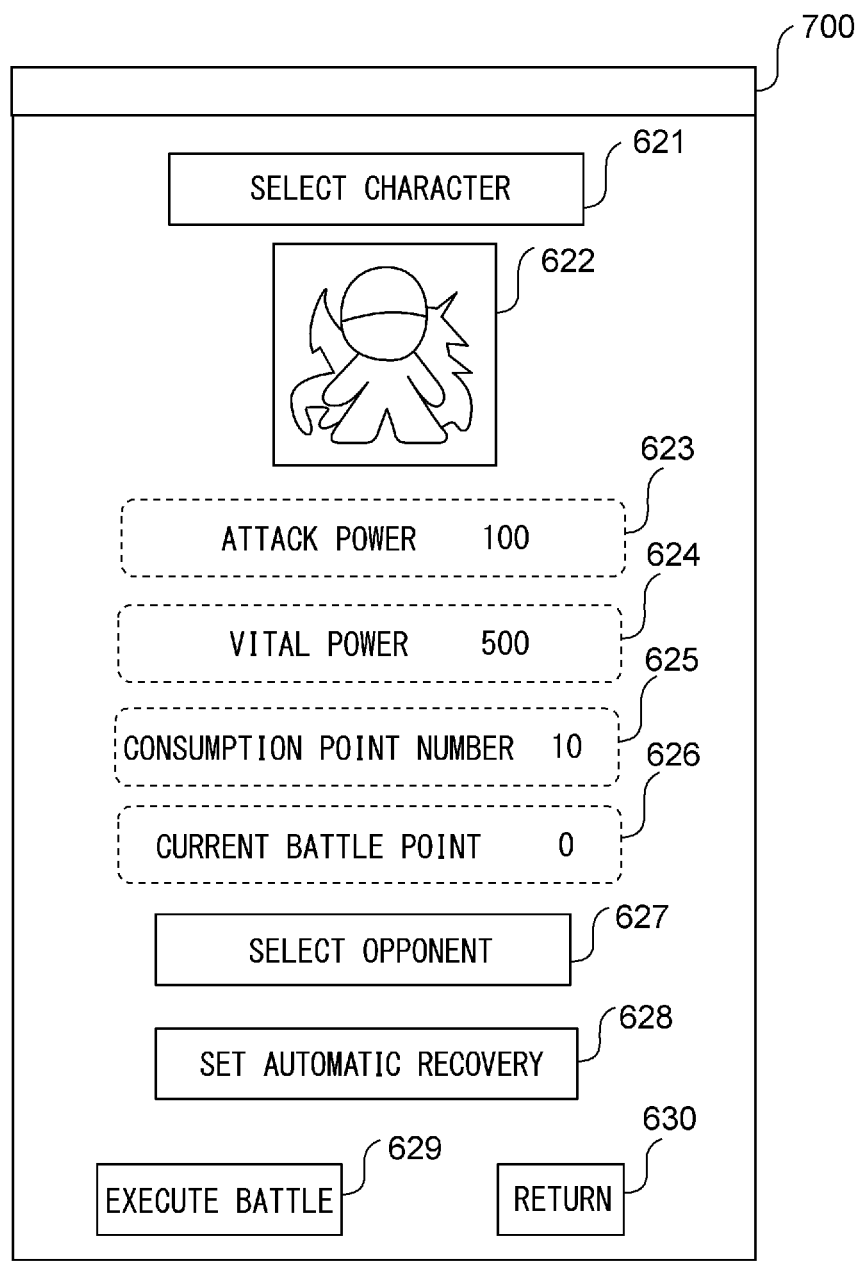

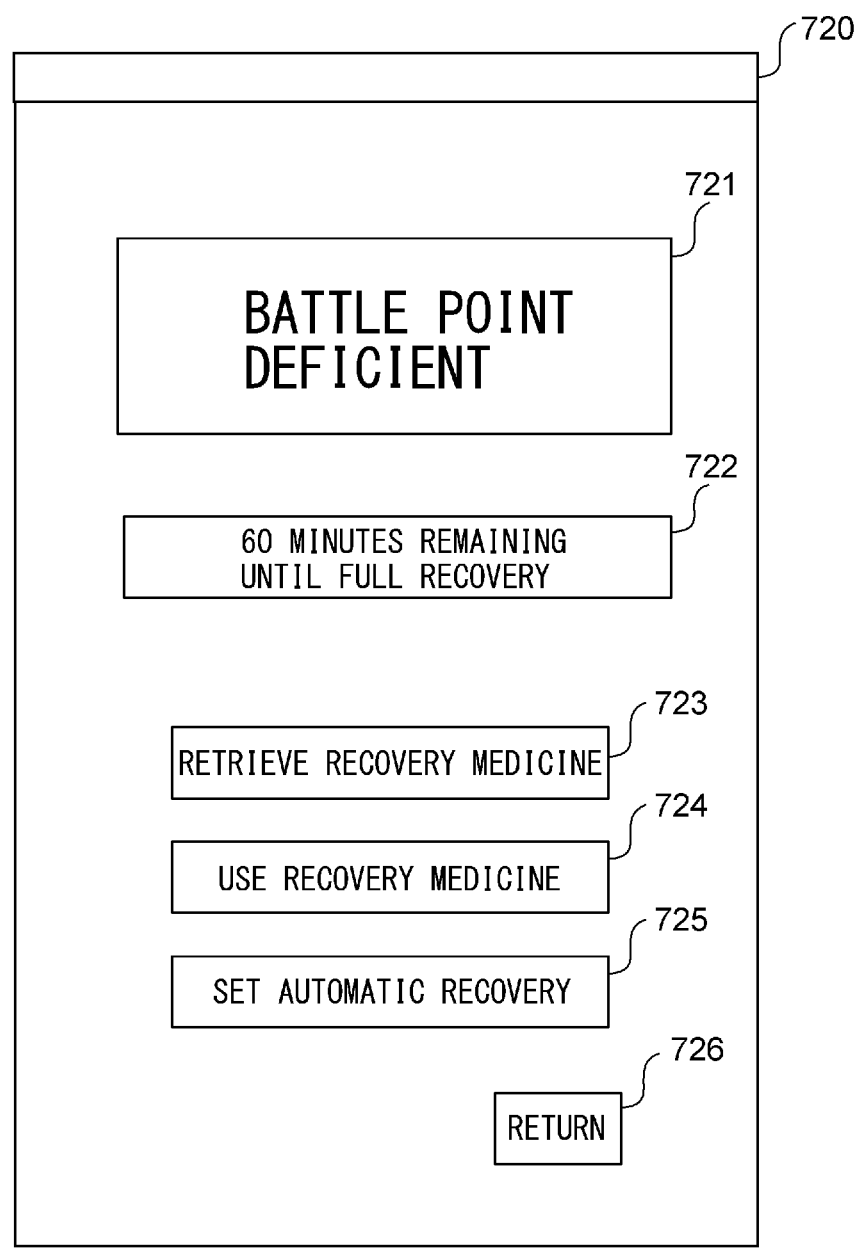

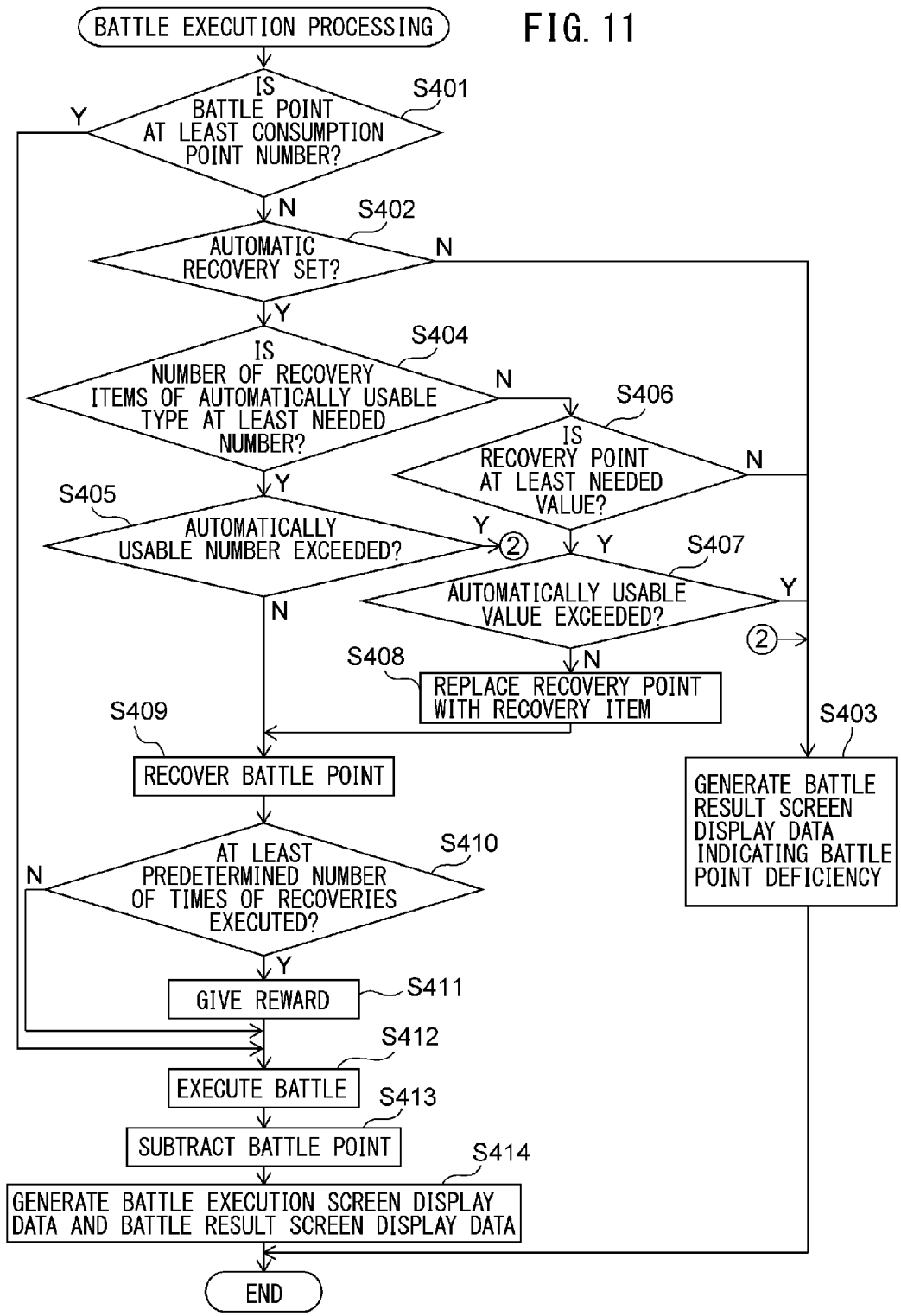

GAME CONTROL METHOD, COMPUTER, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2013-254248, filed on Dec. 9, 2013, and prior Japanese Patent Application No. 2014-140783, filed on Jul. 8, 2014, the entire contents of which are incorporated herein by reference.

TECHNICAL FIELD

Embodiments discussed in the present specification relate to controlling a game.

BACKGROUND

Over recent years, servers providing games for portable devices via communication networks have been in widespread use (for example, Japanese Laid-open Patent Publication No. 2013-230229).

SUMMARY

It is an object of the disclosed game control method, computer-readable, non-transitory medium, and computer to maintain a continuing motivation of a player for a game.

Provided is a game control method used in a computer executing a game. The method includes storing a possessed point possessed by a player for executing an event in the game and a recovery point or a recovery item possessed by the player for recovering the possessed point, executing the event under a condition where the possessed point is at least a predetermined value and consuming the predetermined value from the possessed point, and automatically recovering the possessed point by using the recovery point or the recovery item when the possessed point is less than the predetermined value.

Preferably, in the game control method, the game control method includes receiving setting whether the possessed point is automatically recovered, the setting being executed by the player, and automatically recovering the possessed point only when automatic recovery of the possessed point is set.

Preferably, in the game control method, the game control method includes receiving setting of an automatically usable number and/or automatically usable types of the recovery items, the setting being executed by the player, and using only the automatically usable number and/or types of the recovery items in order to automatically recover the possessed point.

Preferably, in the game control method, the game control method includes receiving setting of an automatically usable value of the recovery point, the setting being executed by the player, and using only the automatically usable value of the recovery point in order to automatically recover the possessed point.

Preferably, in the game control method, the game control method includes giving a reward to the player according to a number of times of automatic recoveries of the possessed point.

Preferably, in the game control method, the game control method includes changing a recovery rate or a recovery amount of the possessed point according to a number of times of automatic recoveries of the possessed point.

Preferably, in the game control method, the game control method includes changing the predetermined value to be consumed according to a number of times of automatic recoveries of the possessed point.

Preferably, in the game control method, the game control method includes setting a recovery rate or a recovery amount upon automatically recovering the possessed point to be larger than a recovery rate or a recovery amount upon recovering the possessed point in accordance with an instruction of the player.

Preferably, in the game control method, the game control method includes storing another player associated with each player, with respect to each player, and upon automatically recovering the possessed point, automatically recovering also a possessed point of the another player associated with the player.

Preferably, in the game control method, the another player associated with the player is another player belonging to the same group as the player, another player having a friend status with the player, or another player having helped the player in a past battle or quest.

Preferably, in the game control method, the event includes a first event and a second event different from the first event, and the possessed point for executing the second event is also automatically recovered upon automatically recovering the possessed point for executing the first event.

Preferably, in the game control method, the game control method includes setting a number of times for automatically recovering the possessed point according to an attribute of a game content used in the event possessed by the player.

Preferably, in the game control method, the game control method includes setting a number of times for automatically recovering the possessed point according to a difficulty level of the event.

Preferably, in the game control method, the event is a battle or a quest.

Provided is a computer executing a game. The computer a storage module for storing a possessed point possessed by a player for executing an event in the game and a recovery point or a recovery item possessed by the player for recovering the possessed point, an event executing module for executing the event under a condition where the possessed point is at least a predetermined value and consuming the predetermined value from the possessed point, and an automatic recovery module for automatically recovering the possessed point by using the recovery point or the recovery item when the possessed point is less than the predetermined value.

Provided is a computer-readable, non-transitory medium storing a computer program, wherein the computer program causes a computer executing a game, to execute a process. The process includes storing a possessed point possessed by a player for executing an event in the game and a recovery point or a recovery item possessed by the player for recovering the possessed point, executing the event under a condition where the possessed point is at least a predetermined value and consuming the predetermined value from the possessed point, and automatically recovering the possessed point by using the recovery point or the recovery item when the possessed point is less than the predetermined value.

The game control method, the computer, and the computer-readable, non-transitory medium can continually maintain a continuing motivation of a player for a game by automatically recovering a point for executing a given event by using a recovery point or a recovery item possessed by the player when the point is less than a predetermined value.

BRIEF DESCRIPTION OF THE DRAWINGS

Other features and advantages of the embodiment will be apparent from the ensuing description, taken in conjunction with the accompanying drawings, in which:

FIG. 4A is a view illustrating one example of a data structure of a player management table;

FIG. 4B is a view illustrating one example of a data structure of a card management table;

FIG. 5C is a view illustrating one example of the display screen of the portable device 2;

FIG. 6B is a view illustrating one example of the display screen of the portable device 2;

FIG. 7A is a view illustrating one example of the display screen of the portable device 2;

FIG. 7C is a view illustrating one example of the display screen of the portable device 2;

FIG. 11 is a view illustrating one example of an operation flow of event execution processing executed by the server 3.

DESCRIPTION OF EMBODIMENTS

The method for forming a game medium group, the computer-readable, non-transitory medium, and the computer according to one aspect of this application will now be described with reference to the drawings.

However, note that the technical scope of this application is not limited to these embodiments and extends to the inventions described in appended claims and their equivalents.

(1) Overview of Embodiment

In a game system of the present embodiment, a player executes a game provided by a server by using a portable device. The server executes a battle (fight) against an enemy character using a game content possessed by the player as an event in the provided game. The enemy character in the battle is a game content possessed by another player or a non-player character. The game content refers to electronic data used in a game and includes, for example, a card, an item, a character, and an avatar. Further, the game content is electronic data able to be retrieved, held, used, managed, replaced, synthesized, strengthened, sold, discarded, and/or donated in the game by a player according to the progress of the game, but a usage form of the game content is not limited to those expressed by the present specification. The present embodiment will describe a card previously registered in the game system as an example of the game content.

In this game, a battle point for executing a battle is provided for the player. The battle point is consumed every time a battle is executed, and when the battle point falls below a needed value for executing a battle, the battle cannot be executed. Every time a certain period of time elapses, the battle point is recovered by a predetermined value, and further, the battle point is also recovered by using a specific recovery item. In the game system of the present embodiment, it is also possible that the player executes setting so as to automatically recover the battle point by using a recovery item possessed by the player when the battle point falls below the needed value for executing a battle. Thereby, even when the battle point falls below the needed value for executing a battle, the player can continue the battle without an operation for recovering the battle point by using the specific recovery item and therefore, it is possible to maintain a continuing motivation of the player for the game.

(2) Configuration of Game System 1

Figure 1:
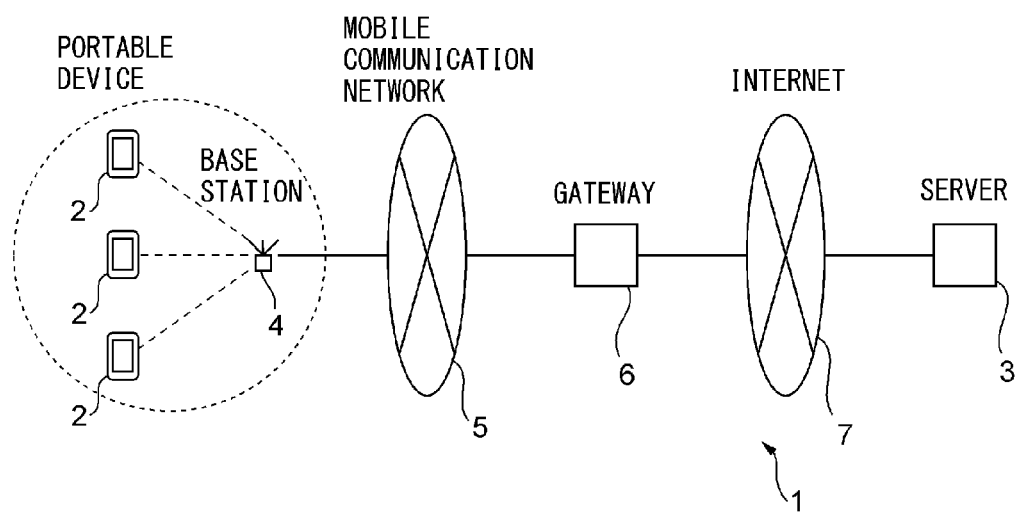
FIG. 1 is a view illustrating one example of a schematic configuration of a game system 1.

FIG. 1 is a view illustrating one example of a schematic configuration of the game system 1.

The game system 1 includes at least one portable device 2 and a server 3. The portable device 2 and the server 3 are connected to each other via a communication network, and are connected to each other, for example, via a base station 4, a mobile communication network 5, a gateway 6, and the Internet 7. Programs executed in the portable device 2 (e.g., a browsing program) and programs executed in the server 3 (e.g., a game program) communicate using a communication protocol such as HTTP (Hypertext Transfer Protocol) and the like.

(2.1) Configuration of Portable Device 2

Figure 2:
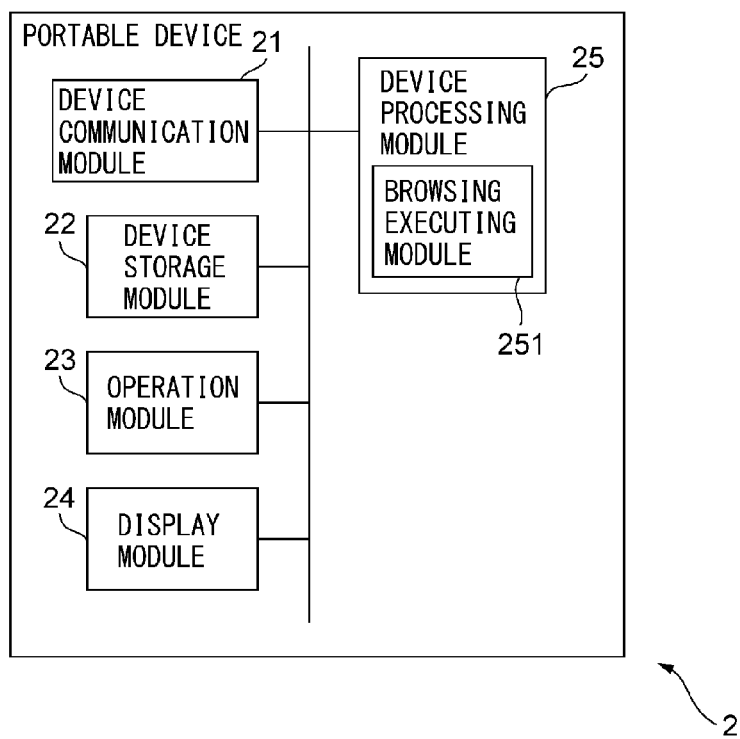
FIG. 2 is a block diagram illustrating one example of a schematic configuration of a portable device 2.

FIG. 2 is a block diagram illustrating one example of a schematic configuration of the portable device 2.

The portable device 2 is connected to the server 3 via the base station 4, the mobile communication network 5, the gateway 6, and the Internet 7 to communicate with the server 3. The portable device 2 executes a game provided from the server 3 in response to an operation of an operation module (a button or the like) executed by a player. To enable this, the portable device 2 includes a device communication module 21, a device storage module 22, an operation module 23, a display module 24, and a device processing module 25.

In the present embodiment, as the portable device 2, a multifunction mobile phone (a so-called "smartphone") is assumed, but this application is not limited thereto. The portable device 2 needs only to be applicable to this application and is also, for example, a mobile phone (a so-called "feature phone"), a PDA (Personal Digital Assistant), a portable game machine, a portable music player, a tablet PC, or the like.

The device communication module 21 includes a communication interface circuit including an antenna where a predetermined frequency band is used as a sensing band, and connects the portable device 2 to a wireless communication network. The device communication module 21 communicates with the base station 4 by establishing a wireless signal line based on a CDMA (Code Division Multiple Access)

system or the like via a channel allocated by the base station 4. The device communication module 21 transmits data supplied from the device processing module 25 to the server 3 or the like. Further, the device communication module 21 supplies data received from the server 3 or the like to the device processing module 25.

The device storage module 22 includes, for example, a semiconductor memory. The device storage module 22 stores an operating system program, a driver program, an application program, data, and the like used for processing in the device processing module 25. The device storage module 22 stores, for example, an input device driver program for controlling the operation module 23, an output device driver program for controlling the display module 24, and the like as driver programs. Further, the device storage module 22 stores a program for retrieving and displaying display data regarding a game provided from the server 3 and the like as application programs. The computer program may be installed on the device storage module 22 from a computer-readable, non-transitory medium such as a compact disk read only memory (CD-ROM), a digital versatile disk read only memory (DVD-ROM), or the like by using a well-known setup program or the like. Further, the device storage module 22 stores, as data, display data, video data, image data, and the like regarding a game received from the server 3. Further, the device storage module 22 may store temporarily temporal data regarding predetermined processing.

The operation module 23 may be any device when being capable of operating the portable device 2 and is, for example, an input device of a touch panel type, a key pad, or the like. A player can input characters (letters and figures), numbers, and the like by using the operation module 23. When operated by the player, the operation module 23 generates a signal corresponding to the operation. Then, the generated signal is supplied to the device processing module 25 as an instruction of the player.

The display module 24 may be any device when being capable of displaying a video, an image, and the like, and is, for example, a display device of a touch panel type, a liquid crystal display, an organic EL (Electro-Luminescence) display, or the like. The display module 24 displays a video according to video data, an image according to image data, and the like supplied from the device processing module 25.

The device processing module 25 includes one or a plurality of processors and a peripheral circuit thereof. The device processing module 25 totally controls the entire operation of the portable device 2 and is, for example, a CPU (Central Processing Unit). The device processing module 25 controls operations of the device communication module 21, the display module 24, and the like so that various types of processing of the portable device 2 are executed in appropriate procedures in accordance with programs stored on the device storage module 22, operations of the operation module 23, and the like. The device processing module 25 executes processing based on a program (an operating system program, a driver program, an application program, or the like) stored on the device storage module 22. Further, the device processing module 25 can execute a plurality of programs (application programs and the like) in parallel.

(2.1.1.) Configuration of Device Processing Module 25

The device processing module 25 includes at least a browsing executing module 251. The browsing executing module 251 is a functional module achieved by a program executed by a processor included in the device processing module 25. Alternatively, the browsing executing module 251 may be mounted in the portable device 2 as firmware.

The browsing executing module 251 executes a game provided by the server 3 in accordance with instructions from a player by using the operation module 23. When receiving a start instruction of the game from the player by using the operation module 23, the browsing executing module 251 further receives a player ID and a password from the player by using the operation module 23 and transmits a game start request including the received player ID and password to the server 3 via the device communication module 21. It is possible that the device storage module 22 previously stores a player ID and a password and then the browsing executing module 251 retrieves the player ID and the password by being read from the device storage module 22. When succeeding in authentication processing using the player ID and the password, the server 3 transmits home screen display data for displaying a home screen to be described later to the portable device 2.

When receiving the home screen display data from the server 3 via the device communication module 21, the browsing executing module 251 prepares drawing data based on the received display data. In other words, the browsing executing module 251 identifies control data and content data by analyzing the received display data, layouts the identified content data in accordance with the identified control data, and prepares drawing data. Then, the browsing executing module 251 outputs the prepared drawing data to the display module 24.

Further, in accordance with an instruction from the player by using the operation module 23, the browsing executing module 251 transmits a game progress request including a request type according to the instruction and the player ID of the player to the server 3 via the device communication module 21. Regarding the request type, any one of a retrieving request of display data of various types of screens such as home screen display data and the like, a request for setting automatic recovery for executing automatic recovery setting of a battle point, an execution request of a battle, and the like is specified. As a response to the game progress request, the browsing executing module 251 receives corresponding display data from the server 3 via the device communication module 21 and prepares drawing data corresponding to the received display data to output the prepared drawing data to the display module 24.

(2.2) Configuration of Server 3

Figure 3:
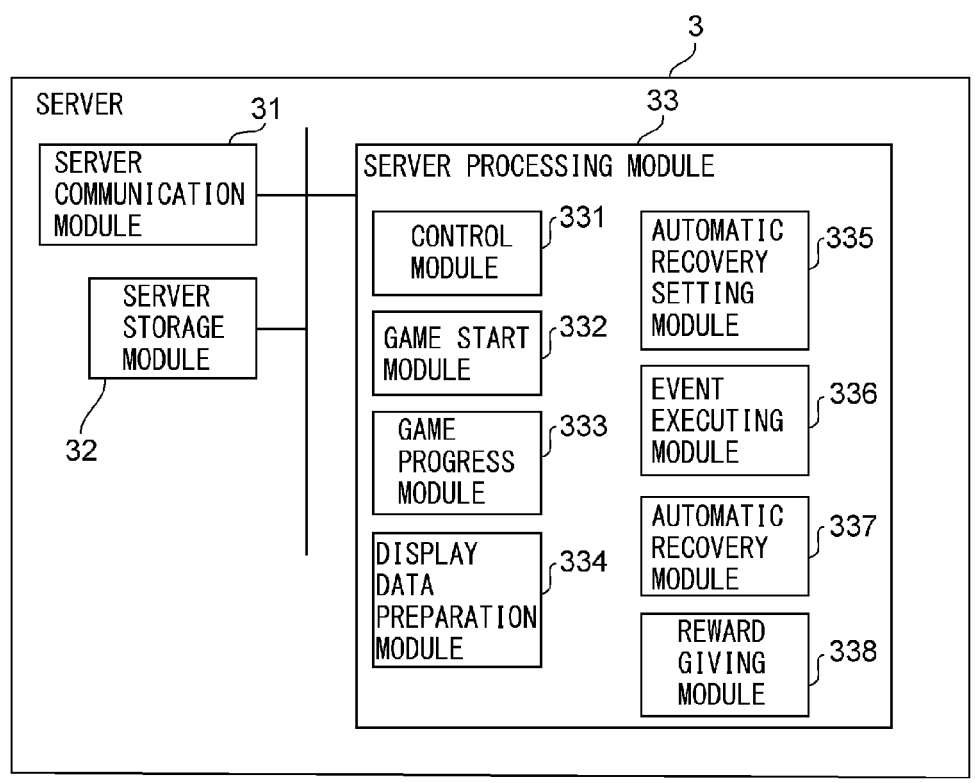
FIG. 3 is a block diagram illustrating one example of a schematic configuration of a server 3.

FIG. 3 is a block diagram illustrating one example of a schematic configuration of the server 3.

The server 3 is one example of a computer executing a game. In response to a request from the portable device 2, the server 3 provides a game that executes a battle and also executes consumption, recovery, and the like of a battle point. Further, the server 3 prepares display data and then transmits the prepared display data to the portable device 2 in response to a request from the portable device 2. Therefore, the server 3 includes a server communication module 31, a server storage module 32, and a server processing module 33.

The server communication module 31 includes a cable communication interface circuit such as Ethernet (a registered trademark) for connecting the server 3 to the Internet 7 to communicate with the Internet 7. The server communication module 31 supplies data received from the portable device 2 or the like to the server processing module 33. Further, the server communication module 31 transmits data supplied from the server processing module 33 to the portable device 2 or the like.

The server storage module 32 includes at least one of a semiconductor memory, a magnetic tape device, a magnetic disk device, or an optical disk device, for example. The server storage module 32 stores an operating system program, a driver program, an application program, data, and the like used for processing in the server processing module 33. The server storage module 32 stores, as application programs, for example, a game program for executing a battle, as well as executing consumption, recovery, and the like of a battle point and preparing display data regarding the result, and the like. The computer program may be installed on the device storage module 22 from a computer-readable, non-transitory medium such as a compact disk read only memory (CD-ROM), a digital versatile disk read only memory (DVD-ROM), or the like by using a well-known setup program or the like. Further, the server storage module 32 stores, as data, a player management table (FIG. 4A) for managing a player, a card management table (FIG. 4B) for managing a card, and the like. Further, the server storage module 32 may store temporarily temporal data regarding predetermined processing.

FIG. 4A is a view illustrating one example of a data structure of a player management table for managing a player. The player management table stores, for each player, a player ID, a password, a name, and a file name of image data of the player, a group ID of a belonging group to which the player belongs, a card ID of a card used in a battle by the player, a battle point possessed by the player, automatic recovery setting whether the battle point is automatically recovered, information on a recovery item and a recovery point for recovering the battle point, the number of times of automatic recoveries where automatic recovery has been executed, and the like. The group to which a player belongs refers to a gathering of a plurality of players constructing a specific cooperative relationship where information is shared using a message transmission/reception function or the like in a game, similar to a team organized with a plurality of players in an event such as a so-called RAID battle and the like. The battle point is one example of a possessed point possessed by a player. As automatic recovery setting, validity or invalidity is stored. As information on the recovery item, with respect to each type of recovery item, an item name of the recovery item, a possessed number, an automatically usable number, a used number, and the like are stored by being associated with each other. As information on the recovery point, a possessed value, an automatically usable value, a used value, and the like are stored. The recovery point is, for example, in-game currency, and a player can retrieve a recovery item by consuming the recovery point.

FIG. 4B is a view illustrating one example of a data structure of a card management table for managing a card. Regarding a card of each character, the card management table stores a card ID, a name and a file name of image data of the card, a consumption point number, an attack power, a vital power, and the like. The consumption point number is a point number necessary for executing a single battle using the card and indicates a predetermined point number consumed from a battle point every time a battle is executed.

The server processing module 33 includes one or a plurality of processors and a peripheral circuit thereof. The server processing module 33 totally controls the entire operation of the server 3 and is, for example, a CPU. The server processing module 33 controls operations of the server communication module 31 and the like so that various types of processing of the server 3 are executed in appropriate procedures in accordance with programs stored on the server storage module 32, and the like. The server processing module 33 executes processing based on a program (an operating system program, a driver program, an application program, or the like) stored on the server storage module 32. Further, the server processing module 33 can execute a plurality of programs (application programs and the like) in parallel.

(2.2.1) Function of Server Processing Module 33

FIGS. 5A to 5D, FIGS. 6A to 6D, and FIGS. 7A to 7C are views each illustrating one example of a display screen of the portable device 2 based on display data prepared by the server 3.

Figure 5A:
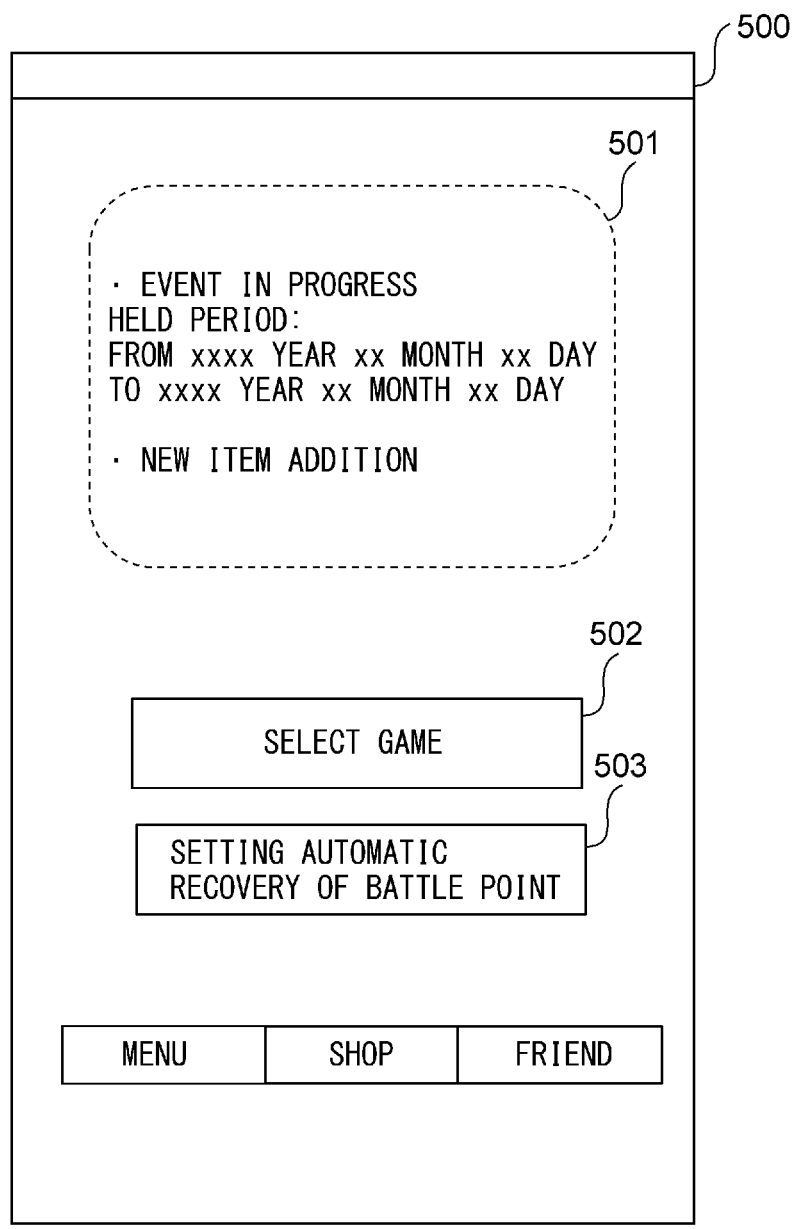
FIG. 5A is a view illustrating one example of the display screen of the portable device 2.

FIG. 5A illustrates a home screen 500 displayed when a game starts. The home screen 500 displays a notice 501 regarding a game, a "select game" button 502, a "set automatic recovery of battle point" button 503, and the like. When the "select game" button 502 is tapped, a game selection screen for selecting a game to be executed is displayed, and when the "set automatic recovery of battle point" button 503 is tapped, a screen for setting automatic recovery of a battle point for executing setting automatic recovery of a battle point is displayed.

Figure 5B:
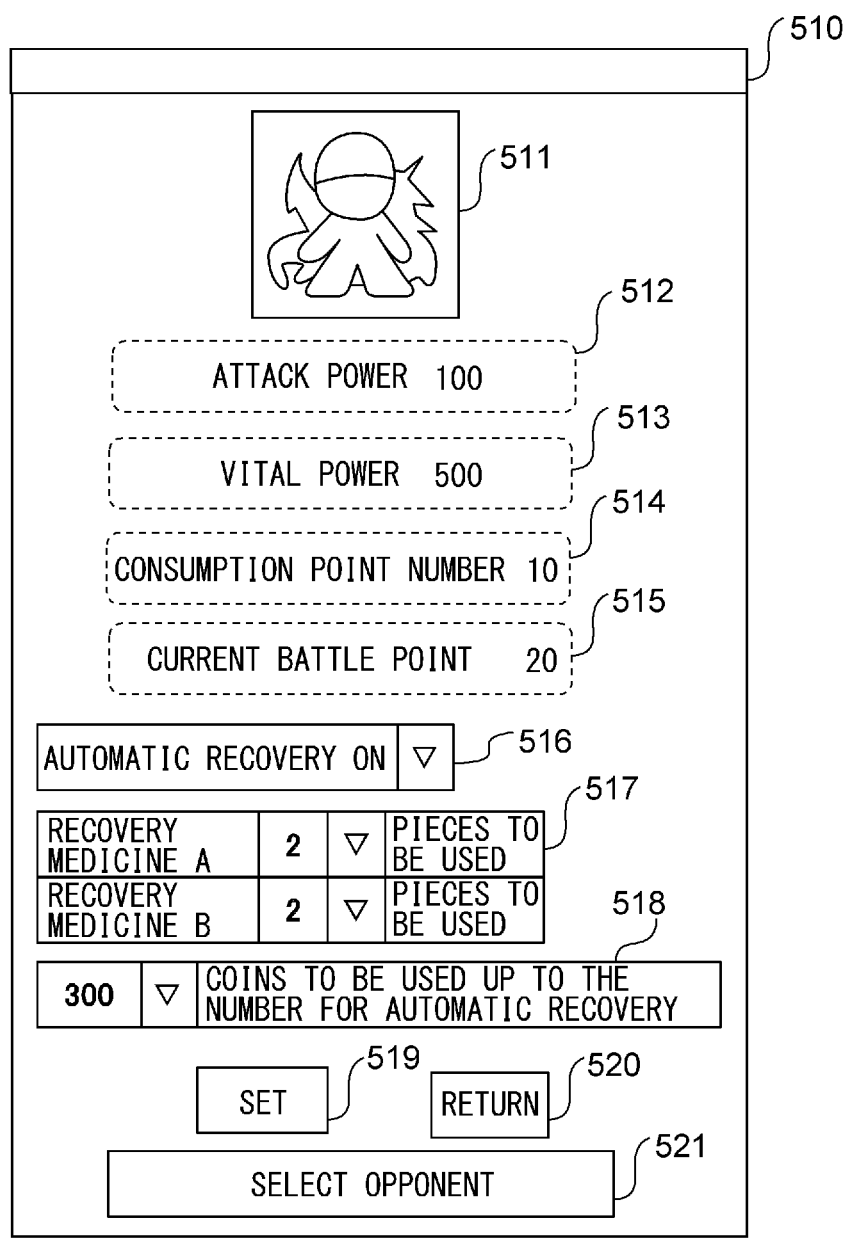
FIG. 5B is a view illustrating one example of the display screen of the portable device 2.

FIG. 5B illustrates a screen for setting automatic recovery of a battle point 510. The screen for setting automatic recovery of a battle point 510 displays an image 511 of a card of a character set to be used in a battle by a player, an attack power 512, a vital power 513, a consumption point number 514, a battle point 515 currently possessed by the player, and the like. In the present embodiment, for easy description, an example where a battle is executed using one card will be described, but it is also possible to execute a battle using a deck including a plurality of cards. In this case, the screen for setting automatic recovery of a battle point 510 displays information regarding each of all the cards configuring the deck and also displays a sum of consumption point numbers of all the cards as a point number necessary for executing a single battle.

The screen for setting automatic recovery of a battle point 510 further displays an input column 516 for specifying whether a battle point is automatically recovered, an input column 517 for specifying an automatically usable number of a recovery item upon automatic recovery, an input column 518 for specifying an automatically usable value of a recovery point, and the like. The input column 517 for an automatically usable number of a recovery item selectably displays a number up to a currently possessed number, in which an automatically usable number currently set is designated as an initial value with respect to each type of recovery item. The input column 518 for an automatically usable value of a recovery point selectably displays a number up to a currently possessed value, in which an automatically usable value currently set is designated as an initial value. A player can set types and a number of automatically usable recovery items using the input column 517. It is possible that setting of the types of automatically usable recovery items is omitted in the input column 517 and an automatically usable number common to all the types of recovery items is set. Further, it is possible that setting of the number of automatically usable recovery items is omitted in the input column 517 and regarding the automatically usable types of recovery items, all the recovery items possessed by the player are allowed to be automatically usable. Further, it is possible that display of the input column 517 and/or the input column 518 is omitted and when a battle point is automatically recovered, all the recovery items and/or the entire recovery point possessed by the player is allowed to be automatically usable.

The screen for setting automatic recovery of a battle point 510 further displays a "set" button 519, a "return" button 520, an "opponent selection" button 521, and the like. When the "set" button 519 is tapped, items specified by the respective input columns 516 to 518 are set in the server 3 and the screen for setting automatic recovery of a battle point is displayed again. When the "return" button 520 is tapped, the home screen is displayed again. When the "opponent selection" button 521 is tapped, an opponent selection screen (not illustrated) for selecting an opponent is displayed. The opponent selection screen displays a list of opponents against whom the player can fight, and the player can select an opponent from the opponent selection screen. Further, it is possible to execute a battle from this opponent selection screen. Further, it is possible that according to an opponent instead of a card of a character set to be used in a battle, a point number necessary for executing a single battle is determined.

Regarding automatically usable recovery items, recovery items themselves are selectable instead of the automatically usable types and number. In this case, for example, an automatic recovery box for previously registering automatically usable recovery items is usable.

FIG. 5C illustrates the screen for setting automatic recovery box 530. The screen for setting automatic recovery box 530 displays a check box 531 for displaying a list of recovery items possessed by the player and selecting each recovery item, an "all selection" button 532 for selecting all the recovery items, and an "all release" button 533 for deselecting all the recovery items. Further, the screen for setting automatic recovery box 530 displays a register button 534 for registering a selected item in an automatic recovery box and a "return" button 535. When checking a check box of a recovery item intended to be automatically usable and tapping the register button 534, the player can select an automatically usable recovery item. With respect to each recovery item possessed by the player, the server storage module 32 stores whether the recovery item is automatically usable, and whether each recovery item is automatically usable is updated in accordance with a designation in the screen for setting automatic recovery box 530. Thereby, the player easily grasps all the recovery items currently possessed and then can determine appropriately which recovery item is allowed to be automatically usable among the possessed recovery items.

Figure 5D:
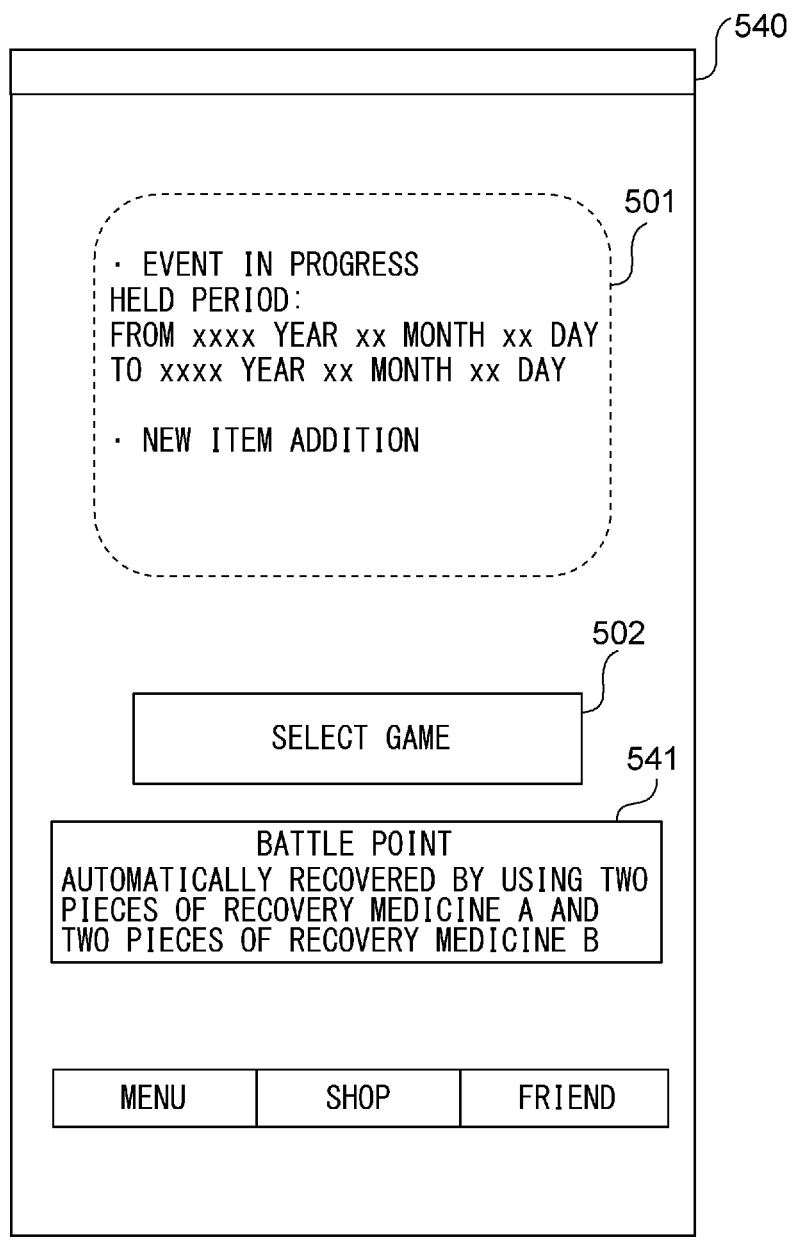
FIG. 5D is a view illustrating one example of the display screen of the portable device 2.

FIG. 5D displays a home screen 540 displayed when automatic recovery setting is valid. In the home screen 540, a "battle point automatic recovery setting" button 541 displays the fact that automatic recovery setting is made and a number of a recovery item automatically used with respect to each type of recovery item.

Figure 6A:
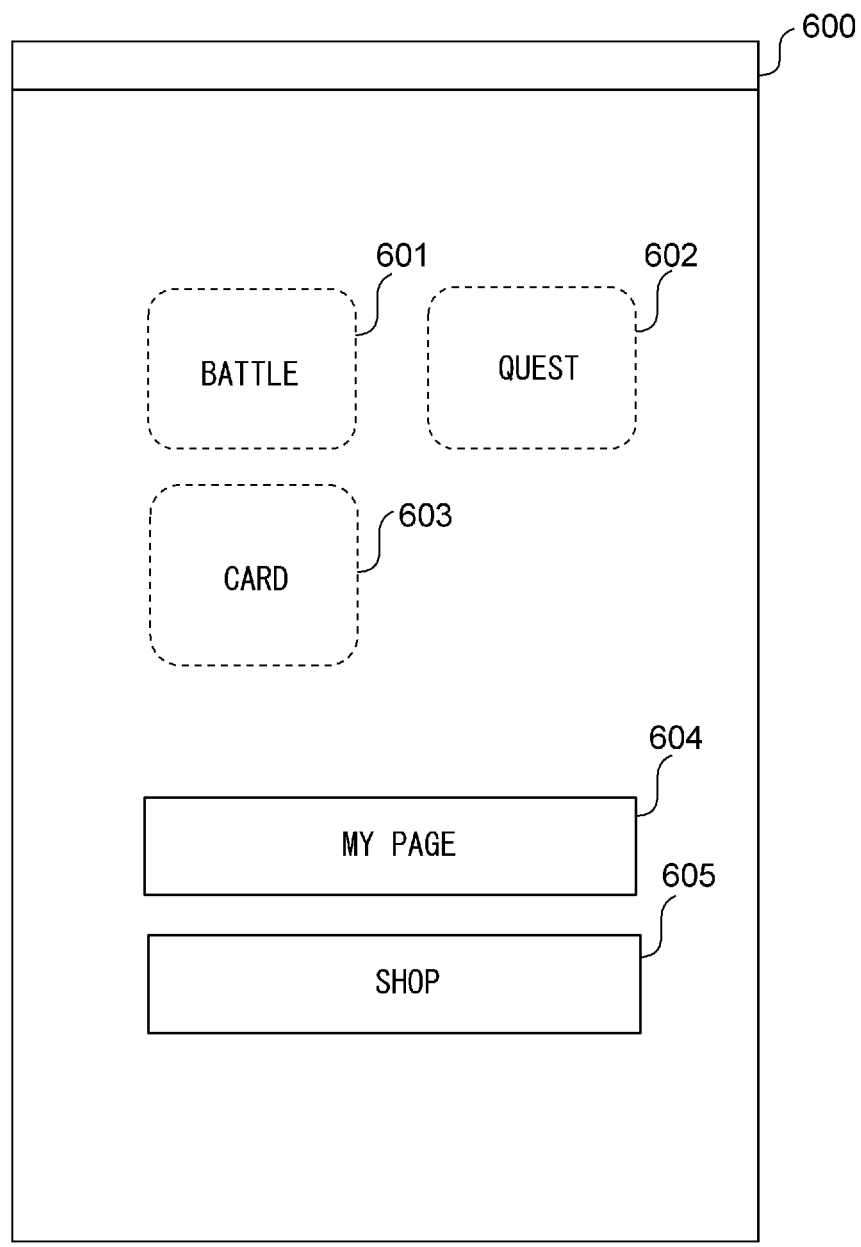
FIG. 6A is a view illustrating one example of the display screen of the portable device 2.

FIG. 6A illustrates a game selection screen 600. The game selection screen 600 displays a "battle" button 601, a "quest" button 602, a "card" button 603, a "my page" button 604, a "shop" button 605, and the like. When the "battle" button 601 is tapped, a battle is selected as a game to be executed and a battle start screen for starting the battle is displayed. When the "quest" button 602 is tapped, a quest is selected as a game to be executed and a quest start screen (not illustrated) for starting the quest is displayed. When the "card" button 603 is tapped, a card setting screen (not illustrated) for executing setting and the like regarding a card possessed by a player is displayed. When the "my page" button 604 is tapped, a my page screen (not illustrated) for executing various settings and the like is displayed. When the "shop" button 605 is tapped, a shop screen (not illustrated) for retrieving an item or the like using in-game currency is displayed.

FIG. 6B illustrates a battle start screen 610. The battle start screen 610 displays a "character selection" button 611 for selecting a card of a character used in a battle, an image 612 of the selected card, an attack power 613, a vital power 614, a consumption point number 615, a battle point 616 currently possessed by a player, and the like. Further, the battle start screen 610 displays an "opponent selection" button 617 similar to the "opponent selection" button 521 of FIG. 5B and an "set automatic recovery" button 618 similar to the "set automatic recovery of battle point" button 503 of FIG. 5A. Further, the battle start screen 610 displays a "execute battle" button 619 and a "return" button 620. When the "character selection" button 621 is tapped, a character selection screen (not illustrated) is displayed. The character selection screen displays a list of cards of characters usable in the battle and the player can select a card of a character used in the battle from the character selection screen. When the "execute battle" button 619 is tapped, a battle execution screen expressing a result content of the battle is displayed. When the "return" button 620 is tapped, the game selection screen 600 is displayed again.

Figure 6C:
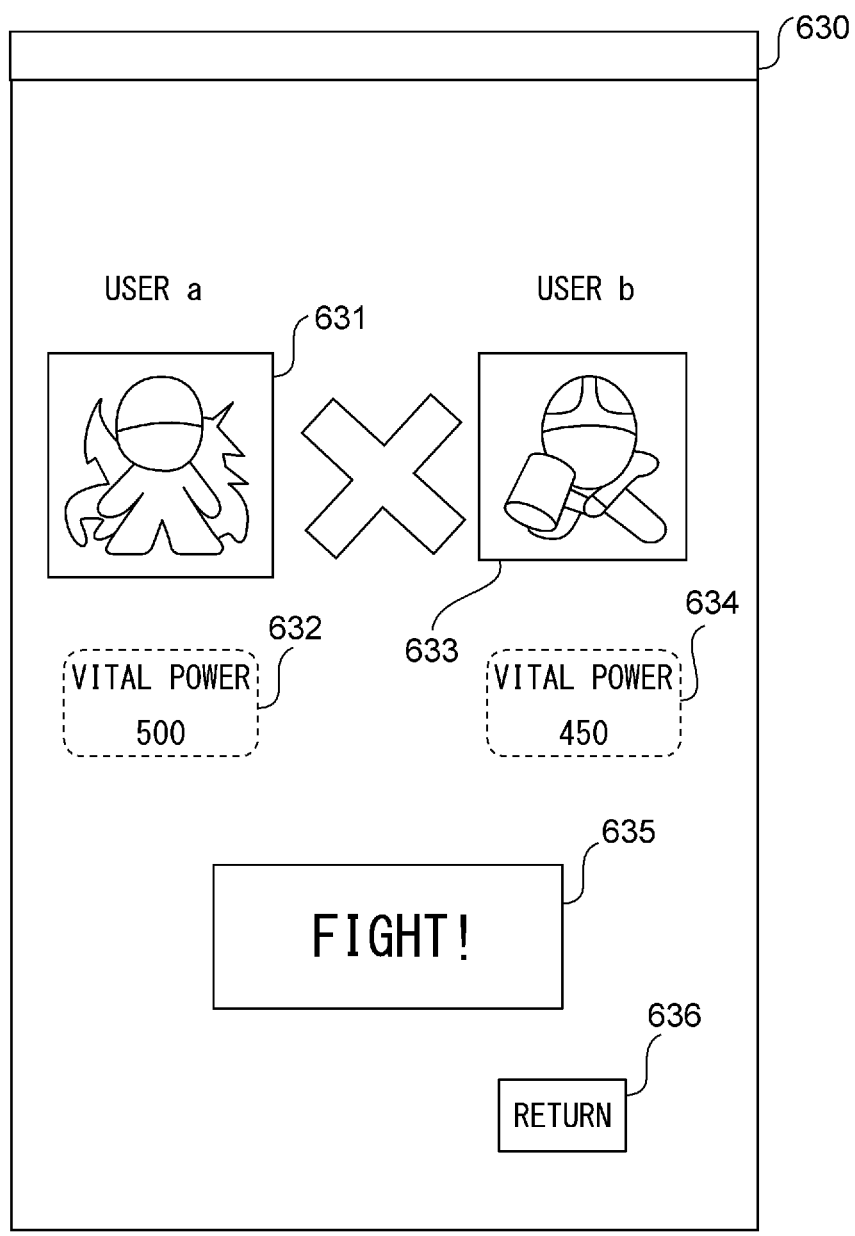
FIG. 6C is a view illustrating one example of the display screen of the portable device 2.
Figure 6D:
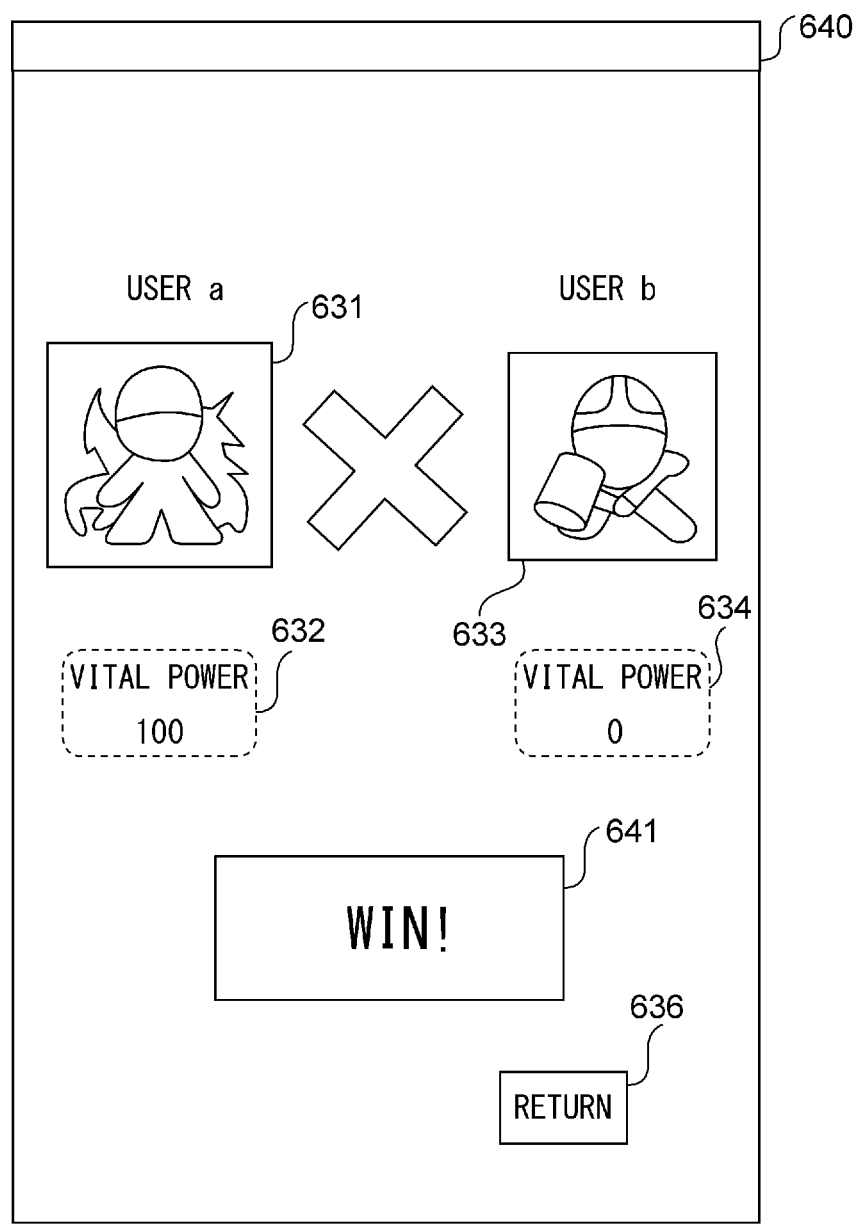
FIG. 6D is a view illustrating one example of the display screen of the portable device 2.

FIGS. 6C and 6D each illustrate a battle execution screen 630 and a battle result screen 640. The battle execution screen 630 is a screen displayed immediately after the "execute battle" button 619 is tapped, and the battle result screen 640 is a screen displayed at the time of battle termination. Both the battle execution screen 630 and the battle result screen 640 display a card 631 of a player executing a game and a vital power 632 thereof and also a card 633 of an opponent and a vital power 634 thereof. In the battle, a damage amount given to the card of the opponent is determined based on an attack power of the card of the player and the determined damage amount is subtracted from a vital power of the card of the opponent. On the other hand, a damage amount given to the card of the player is determined based on an attack power of the card of the opponent and the determined damage amount is subtracted from a vital power of the card of the player. Then, when the vital power of the card of the opponent becomes 0 first, the player wins, and when the vital power of the card of the player becomes 0 first, the player loses. The battle result screen 640 displays a performance image of the battle expressing changes in the vital power of each of the card of the player and the card of the opponent by using an animation or the like, and displays a result content (victory or defeat) 641. Further, both the battle execution screen 630 and the battle result screen 640 display a "return" button 636. When the "return" button 636 is tapped, the battle start screen is displayed again.

FIG. 7A illustrates a battle start screen 700 displayed after battle execution. In the battle start screen 700, a value of a battle point 626 has been changed to a value (0) where a value (10) of the consumption point number 615 is subtracted from a value (10) displayed in the battle start screen 610 of FIG. 6B prior to battle execution.

When automatic recovery setting is valid, upon tapping a "execute battle" button 629 in the battle start screen 700 of FIG. 7A, the battle point is recovered from 0 to a predetermined value (e.g., 50) by using a recovery item and then a battle is executed again.

Figure 7B:
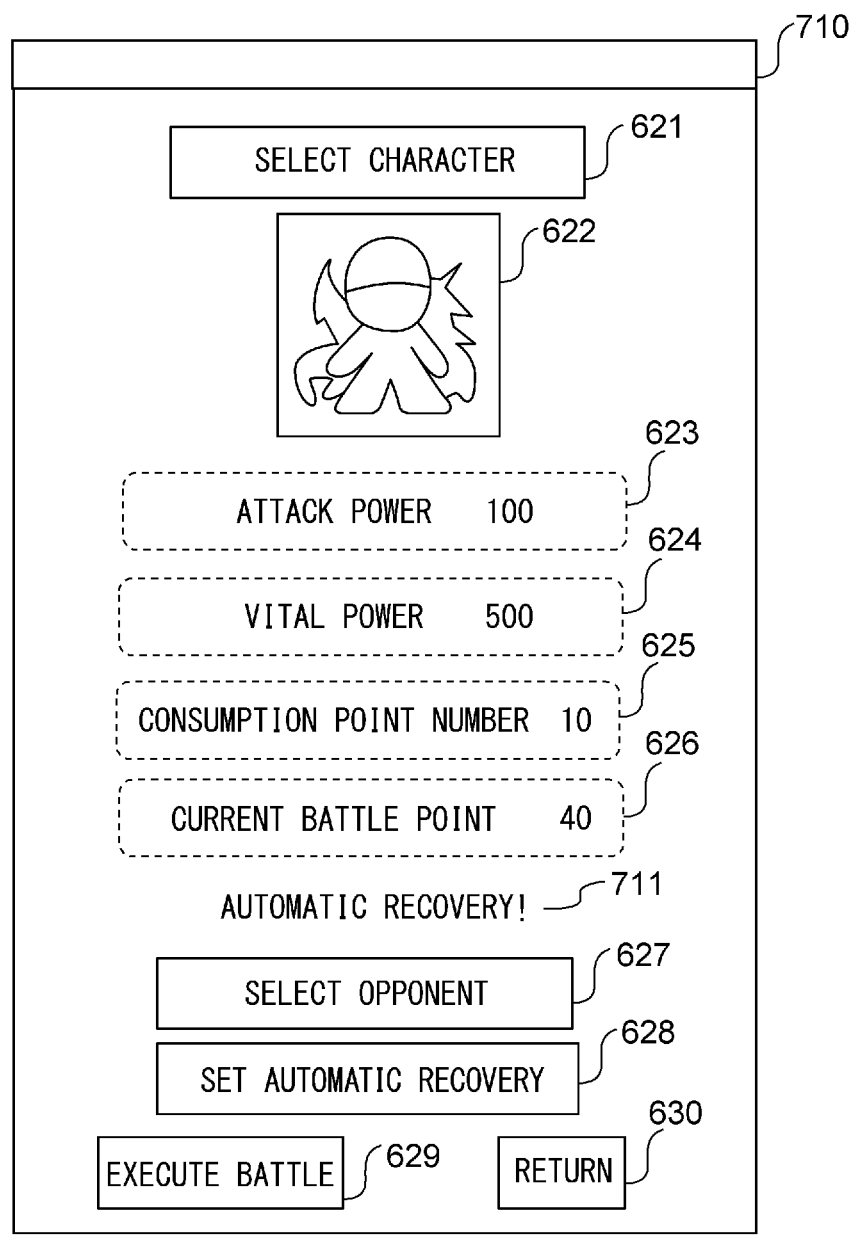
FIG. 7B is a view illustrating one example of the display screen of the portable device 2.

FIG. 7B illustrates a battle start screen 710 displayed after battle execution of this case. In the battle start screen 710, the value of the battle point 626 has been recovered from a value (0) displayed in the battle start screen 700 of FIG. 7A prior to battle execution to a predetermined value (50) and further has been changed to a value (40) where a value (10) of a consumption point number 625 is subtracted. Further, the battle start screen 710 displays a fact that automatic recovery has been executed 711. It is possible that display of the battle start screen 710 is omitted and instead, a battle execution screen is displayed next to the battle start screen 700.

On the other hand, when automatic recovery setting is invalid, upon tapping the "execute battle" button 629 in the battle start screen 700 of FIG. 7A, no battle is executed and then a battle result screen indicating that a battle point is deficient is displayed.

FIG. 7C illustrates a battle result screen 720 indicating that a battle point is deficient. The battle result screen 720 displays a fact that a battle point is deficient 721, a time 722 taken until the battle point is recovered, a "recovery item retrieving" button 723 for retrieving a recovery item by using a recovery point, a "recovery item use" button 724 for using a recovery item possessed by a player, an "set automatic recovery" button 725, and a "return" button 726. When the "recovery item retrieving" button 723 is tapped, a shop screen for retrieving a recovery item by using a recovery point is displayed. When the "recovery item use" button 724 is tapped, a screen for using a recovery item possessed by the player is displayed and from the displayed screen, the player can specify a number and types of recovery items to be used and the like. When the "set automatic recovery" button 725 is tapped, a screen for setting automatic recovery of a battle point is displayed. When the "return" button 726 is tapped, a battle start screen is displayed again. The battle result screen 720 makes it possible that the player selects whether to wait until the time 722 elapses, whether to use a possessed recovery item, whether to retrieve a recovery item by using a recovery point, or whether to execute automatic recovery setting.

(2.2.2) Configuration of Server Processing Module 33

To achieve the above functions, the server processing module 33 includes, as illustrated in FIG. 3A, a control module 331, a game start module 332, a game progress module 333, a display data preparation module 334, an automatic recovery setting module 335, an event executing module 336, an automatic recovery module 337, and a reward giving module 338. Each of these modules is a functional module achieved by a program executed in a processor included in the server processing module 33. Alternatively, each of these modules may be mounted in the server 3 as firmware.

Processing executed by the control module 331 will be described below. The control module 331 controls the progress of a game, and instructs the game start module 332, the game progress module 333, or the like to execute processing, as appropriate.

When receiving a game start request from the portable device 2 via the server communication module 31, the control module 331 transmits a player ID and a password included in the received game start request to the player authentication module (not illustrated) and issues an instruction for executing authentication processing.

When the player authentication module has succeeded in authentication, the control module 331 transfers the player ID to the game start module 332 and issues an instruction for executing game start processing. Further, the control module 331 transmits home screen display data received from the game start module 332 to the portable device 2 via the server communication module 31.

On the other hand, when receiving a game progress request from the portable device 2 via the server communication module 31, the control module 331 transfers the received game progress request to the game progress module 333 and issues an instruction for executing game progress processing. Further, the control module 331 transmits various types of display data received from the game progress module 333 to the portable device 2 via the server communication module 31.

The game start module 332 prepares home screen display data displaying buttons for receiving various types of instructions (game start, automatic recovery setting, display data preparation, and the like) and the like. Then, the game start module 332 transfers the prepared home screen display data to the control module 331.

Processing executed by the game progress module 333 will be described below. The game progress module 333 progresses a game in response to a game progress request and prepares various types of display data displaying information according to the progress result. Then, the game progress module 333 transfers the prepared display data to the control module 331.

The game progress module 333 identifies a request of the portable device 2 from a request type included in the game progress request received from the control module 331.

When the identified request is a retrieving request of home screen display data, the game progress module 333 transfers a player ID included in the game progress request to the game start module 332 and also issues an instruction for preparing home screen display data. In this case, the game start module 332 identifies a player corresponding to the player ID received from the game progress module 333. Further, the game start module 332 transfers the prepared home screen display data to the game progress module 333.

When the identified request is a retrieving request of each screen display data other than the home screen, the game progress module 333 transfers the player ID included in the game progress request to the display data preparation module 334 and also issues an instruction for preparing each screen display data.

When the identified request is a request for setting automatic recovery of a battle point, the game progress module 333 transfers the player ID included in the game progress request and each setting included in the request for setting automatic recovery to the automatic recovery setting module 335 and also issues an instruction for setting automatic recovery of the battle point.

When the identified request is an executing request of a battle, the game progress module 333 transfers the player ID included in the game progress request to the event executing module 336 and also issues an instruction for executing the battle.

The game progress module 333 transfers display data received from the game start module 332, the display data preparation module 334, the automatic recovery setting module 335, or the event executing module 336 to the control module 331.

Processing executed by the display data preparation module 334 will be described below. The display data preparation module 334 prepares display data for displaying each screen and transfers the prepared display data to the game progress module 333.

The display data preparation module 334 receives a preparation instruction for display data such as a game selection screen, a screen for setting automatic recovery of a battle point, an opponent selection screen, a battle start screen, a quest start screen, a card setting screen, a my page screen, a shop screen, a character selection screen, and the like from the game progress module 333. The display data preparation module 334 refers to a player management table stored on the server storage module 32 to identify a player corresponding to the player ID received from the game progress module 333 and also prepares display data of each screen corresponding to the identified player.

When preparing display data of a screen for setting automatic recovery of a battle point, the display data preparation module 334 refers to the player management table and extracts a card ID of a card used in a battle, a battle point, an item name of a recovery item, a possessed number and an automatically usable number, a possessed value of a recovery point and an automatically usable value, and the like. Further, the display data preparation module 334 refers to a card management table stored on the server storage module 32 and extracts a name, a file name of image data, a consumption point number, an attack power, and a vital power of a card corresponding to the card ID extracted from the player management table. Then, the display data preparation module 334 prepares the screen display data for setting automatic recovery of a battle point for displaying, in a predetermined layout, each extracted information, a "setting" button, a "return" button, an "opponent selection" button, and the like, and transfers the prepared display data to the game progress module 333. Also when preparing display data of a battle start screen, the display data preparation module 334 extracts information of a card used in the battle from the card management table and prepares display data of the battle start screen in the same manner.

Processing executed by the automatic recovery setting module 335 will be described below. When the game progress module 333 issues an instruction for automatic recovery setting of a battle point, the automatic recovery setting module 335 receives each setting executed by the player and executes automatic recovery setting of the battle point.

When an instruction for setting automatic recovery of a battle point is issued, the automatic recovery setting module 335 refers to the player management table stored on the server storage module 32 and identifies a player corresponding to the player ID received from the game progress module 333. The automatic recovery setting module 335 sets automatic recovery setting of a battle point, an automatically usable number of a recovery item, and an automatically usable value of a recovery point in the player management table in accordance with each setting included in the request for setting automatic recovery received from the game progress module 333. Further, the automatic recovery setting module 335 prepares the screen display data for setting automatic recovery of a battle point and transfers the prepared display data to the game progress module 333 so that the player can confirm the set contents in the same manner as the display data preparation module 334.

Processing executed by the event executing module 336 will be described below. When the game progress module 333 issues an instruction for executing a battle, the event executing module 336 executes the battle.

When an instruction for executing the battle is issued, the event executing module 336 refers to the player management table stored on the server storage module 32 and identifies a player corresponding to the player ID received from the game progress module 333 and a current battle point of the player. Further, the event executing module 336 extracts a card ID of a card used in the battle by the identified player and extracts an attack power, a vital power, a consumption point number, and the like corresponding to the extracted card ID from the card management table.

The event executing module 336 executes the battle under a condition where the current battle point is at least the consumption point number of the card used in the battle. The event executing module 336 determines a damage amount given to a card of an opponent based on the attack power of the card of the player used in the battle and subtracts the determined damage amount from a vital power of the card of the opponent. On the other hand, the event executing module 336 determines a damage amount given to the card of the player based on an attack power of the card of the opponent and subtracts the determined damage amount from a vital power of the card of the player. When the vital power of the card of the opponent becomes 0 first, the event executing module 336 determines that the player has won, and when the vital power of the card of the player becomes 0 first, the event executing module 336 determines that the player has lost.

Further, the event executing module 336 executes the battle and then consumes the consumption point number from the battle point by subtracting the consumption point number from the battle point of the player management table. Further, the event executing module 336 prepares battle execution screen display data and battle result screen display data for displaying a performance image and a result content of the battle, respectively, and transfers the prepared display data to the game progress module 333.

Processing executed by the automatic recovery module 337 will be described below. When the event executing module 336 determines that the battle point is less than the consumption point number, the automatic recovery module 337 automatically recovers the battle point by using a recovery item.

When automatic recovery setting of the battle point is valid; a possessed number of a recovery item of an automatically usable type is at least a needed number (e.g., 1) for recovering a deficient battle point; and a used number of the recovery item is at most an automatically usable number, in the player management table, the automatic recovery module 337 recovers the battle point. The automatic recovery module 337 adds a value according to a recovery amount or a recovery rate determined for each recovery item to the battle point in the player management table to recover the battle point. It is possible that the automatic recovery module 337 updates the battle point of the player management table to an upper limit determined for each player to recover the battle point. The automatic recovery module 337 decrements (subtracts one from) a possessed number of the recovery item of the player management table and also increments (adds one to) a used number thereof. Further, the automatic recovery module 337 increments the number of times of automatic recoveries in the player management table. When a plurality of types of recovery items is set as automatically usable recovery items, the automatic recovery module 337 uses these recovery items in accordance with a predetermined priority (in ascending or descending order of recovery amount or recovery rate). The player may specify this priority.

On the other hand, even when the battle point becomes less than a consumption point number, the automatic recovery module 337 does not recover automatically the battle point upon invalidity for automatic recovery setting of the battle point in the player management table. Further, when a used number of a recovery item exceeds an automatically usable number thereof, no recovery item is used and then no battle point is automatically recovered. In these cases, the automatic recovery module 337 prepares battle result screen display data for displaying a battle point deficiency and transfers the prepared display data to the game progress module 333.

Further, also when the possessed number of the recovery item is less than a needed number, the automatic recovery module 337 uses no recovery point and then does not recover automatically the battle point, in which a possessed value of the recovery point is less than a needed value for retrieving a recovery item or a used value of the recovery point exceeds an automatically usable value. On the other hand, when the possessed value of the recovery point is at least the needed value and also the used value of the recovery point is at most the automatically usable value, the automatic recovery module 337 replaces the recovery point with the recovery item. The automatic recovery module 337 increases the possessed number of the recovery item and also subtracts a needed value from the recovery point in the player management table, to replace the recovery point with the recovery item. Then, the automatic recovery module 337 recovers the battle point by using this recovery item. It is possible that the automatic recovery module 337 directly recovers the battle point by using the recovery point instead of replacing the recovery point with the recovery item.

In this manner, the automatic recovery module 337 uses only the automatically usable number and/or types of recovery items to automatically recover the battle point. Further, the automatic recovery module 337 uses only the automatically usable value of a recovery point to automatically recover the battle point. Thereby, even when a computer automatically recovers the battle point, the player can obtain a feeling of controlling the progress of a battle in a certain range.

The automatic recovery module 337 may change a recovery rate or a recovery amount of the battle point according to the number of times of automatic recoveries of the battle point. In this case, the automatic recovery module 337 increases the recovery rate or the recovery amount of the battle point as the number of times of automatic recoveries of the battle point increases. Further, the automatic recovery module 337 may change a consumption point number consumed upon battle execution, according to the number of times of automatic recoveries of the battle point. In this case, the automatic recovery module 337 decreases the consumption point number as the number of times of automatic recoveries of the battle point increases. Further, it is possible that the automatic recovery module 337 sets a recovery rate or a recovery amount upon automatic recovery of a possessed point to be larger than that upon recovery of the possessed point in accordance with an instruction of the player. Thereby, the automatic recovery of the possessed point becomes attractive to the player and then a usage rate of an automatic recovery function can be increased.

Further, when another player associated with a player is stored in the player management table, the automatic recovery module 337 may recover automatically also a battle point of the another player associated with the player, in which the battle points of players associated with each other are linked together and a battle point of a given player is automatically recovered. When, for example, the battle point of a given player is automatically recovered, the automatic recovery module 337 automatically recovers also the battle point of another player belonging to the same belonging group as the given player. In this case, only when, for example, the battle point of a given player is automatically recovered at a predetermined number of times or more or a win is realized via random number generation processing or the like, the battle point of another player may be recovered automatically. Further, a recovery rate or a recovery amount of the battle point of another player may be smaller than a recovery rate or a recovery amount of the battle point of a given player. The another player associated with a player is not limited to another player belonging to the same belonging group as the player but may be another player having a friend status with the player or another player having helped the player in a battle against an enemy character or a quest in the past. Thereby, a construction motivation for a cooperative relationship within a game can also be enhanced.

Further, the automatic recovery module 337 may set the number of times (or an upper limit thereof) of automatic recoveries according to a difficulty level (a level of an opponent) of a battle. In this case, the automatic recovery module 337 sets the number of times (or an upper limit thereof) of automatic recoveries to be large as the difficulty level of the battle increases. Thereby, it becomes possible to set the number of times of automatic recoveries to the same extent as the number of times that a possessed point becomes 0 before defeating the opponent and then it becomes possible to set the number of times of automatic recoveries in a range where an event can be progressed smoothly.

Further, when an attribute such as level or scarcity is set for a card used in a battle, the automatic recovery module 337 may set the number of times (or an upper limit thereof) of automatic recoveries of a battle point according to the attribute of the card used in the battle. In this case, the automatic recovery module 337 sets the number of times (or an upper limit thereof) of automatic recoveries to be large as the level or scarcity of the card used in the battle increases. Thereby, a player can set the number of times of automatic recoveries to be large as the level is high, and a level enhancement motivation of the player can be enhanced. Further, the automatic recovery module 337 may set the number of times (or an upper limit thereof) of automatic recoveries according to the number of times of logins of the player, the number of times of battle executed by the player, the number of players having a friend status with the player, or the like. In this case, the automatic recovery module 337 sets the number of times (or an upper limit thereof) of automatic recoveries to be large as the number of times of logins of the player, the number of times of battle executed by the player, the number of players having a friend status with the player, or the like increase. Thereby, it is possible to enhance an execution motivation of a game of a player, a participation motivation for a battle, and a construction motivation for a cooperative relationship within a game.

Processing executed by of the reward giving module 338 will be described below. The reward giving module 338 gives a reward to a player according to the number of times of automatic recoveries of a possessed point.

When the automatic recovery module 337 automatically recovers a possessed point, the reward giving module 338 determines whether the number of times of automatic recoveries of the player management table is at least a predetermined number of times. When the number of times of automatic recoveries is at least a predetermined number of times, the reward giving module 338 gives a reward to a player. The reward giving module 338 gives, for example, a card of a specific character, a recovery item, or the like to the player as a reward. The reward giving module 338 gives a high reward, e.g., a card or a recovery item having high level or scarcity, to the player as the number of times of automatic recoveries increases. Thereby, the automatic recovery of the possessed point becomes attractive to the player and then a usage rate of an automatic recovery function can be increased.

(3) Operation of Game System 1

Figure 8:
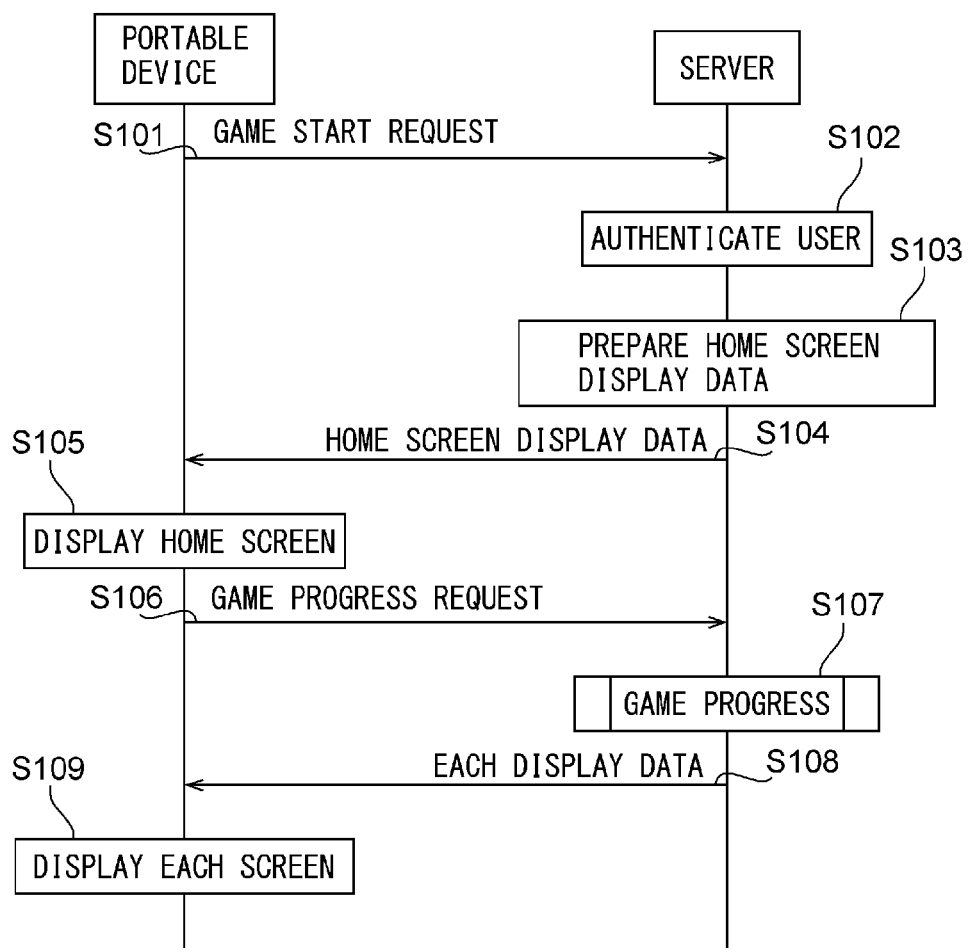
FIG. 8 is a view illustrating one example of an operation sequence of the game system 1.

FIG. 8 illustrates one example of an operation sequence of the game system 1. The below-described operation sequence is executed mainly by the device processing module 25 and the server processing module 33 based on programs previously stored on the device storage module 22 and the server storage module 32, respectively, in cooperation with each element of the portable device 2 and the server 3.

A player issues an instruction for starting a game using the operation module 23 of the portable device 2. The browsing executing module 251 receives a player ID and a password from the player by using the operation module 23 and transmits a game start request including the received player ID and password to the server 3 via the device communication module 21 (step S101).

When receiving the game start request from the portable device 2 via the server communication module 31, the control module 331 of the server 3 transmits the player ID and the password included in the received game start request to the player authentication module and issues an instruction for executing authentication processing (step S102).

When the player authentication module succeeds in authentication, the control module 331 transfers the player ID to the game start module 332 and issues an instruction for executing game start processing. When the control module 331 issues the instruction for executing game start processing, the game start module 332 prepares home screen display data and transfers the prepared home screen display data to the control module 331 (step S103).

Then, the control module 331 transmits the home screen display data received from the game start module 332 to the portable device 2 via the server communication module 31 (step S104).

When receiving the home screen display data from the server 3 via the device communication module 21, the browsing executing module 251 prepares drawing data based on the received home screen display data. The browsing executing module 251 outputs the prepared drawing data to the display module 24 to display a home screen (step S105).

Then, in accordance with an instruction from a player using the operation module 23, the browsing executing module 251 transmits a game progress request including a request type corresponding to the instruction and the player ID of the player to the server 3 via the device communication module 21 (step S106).

When the "set" button 519 of the screen for setting automatic recovery of battle point 510 of FIG. 5B is tapped, the request type becomes a request for setting automatic recovery of a battle point. This request for setting automatic recovery includes setting specified in each of the input columns 516 to 518. Further, when the "execute battle" button 619 of the battle start screen 610 of FIG. 6B is tapped, the request type becomes an execution request for a battle. Further, when each button other than the above ones illustrated in each screen in FIGS. 5A to 5D, FIGS. 6A to 6D, and FIGS. 7A to 7C is tapped, the request type becomes an retrieving request of display data of each corresponding screen.

When receiving the game progress request from the portable device 2 via the server communication module 31, the control module 331 transfers the received game progress request to the game progress module 333 and issues an instruction for executing game progress processing. When the control module 331 issues the instruction for executing game progress processing, the game progress module 333 executes game progress processing (step S107). In the game progress processing, each module of the server processing module 33 prepares display data corresponding to the received game progress request, and the game progress module 333 transfers the prepared display data to the control module 331. Details of the game progress processing will be described later.

Then, the control module 331 transmits each display data received from the game progress module 333 to the portable device 2 via the server communication module 31 (step S108).

When receiving each display data and the like from the server 3 via the device communication module 21, the browsing executing module 251 prepares drawing data based on the received display data. Further, the browsing executing module 251 outputs the prepared drawing data to the display module 24 to display a corresponding screen (step S109). Thereafter, processing of steps S106 to S109 is repeated.

Figure 9:
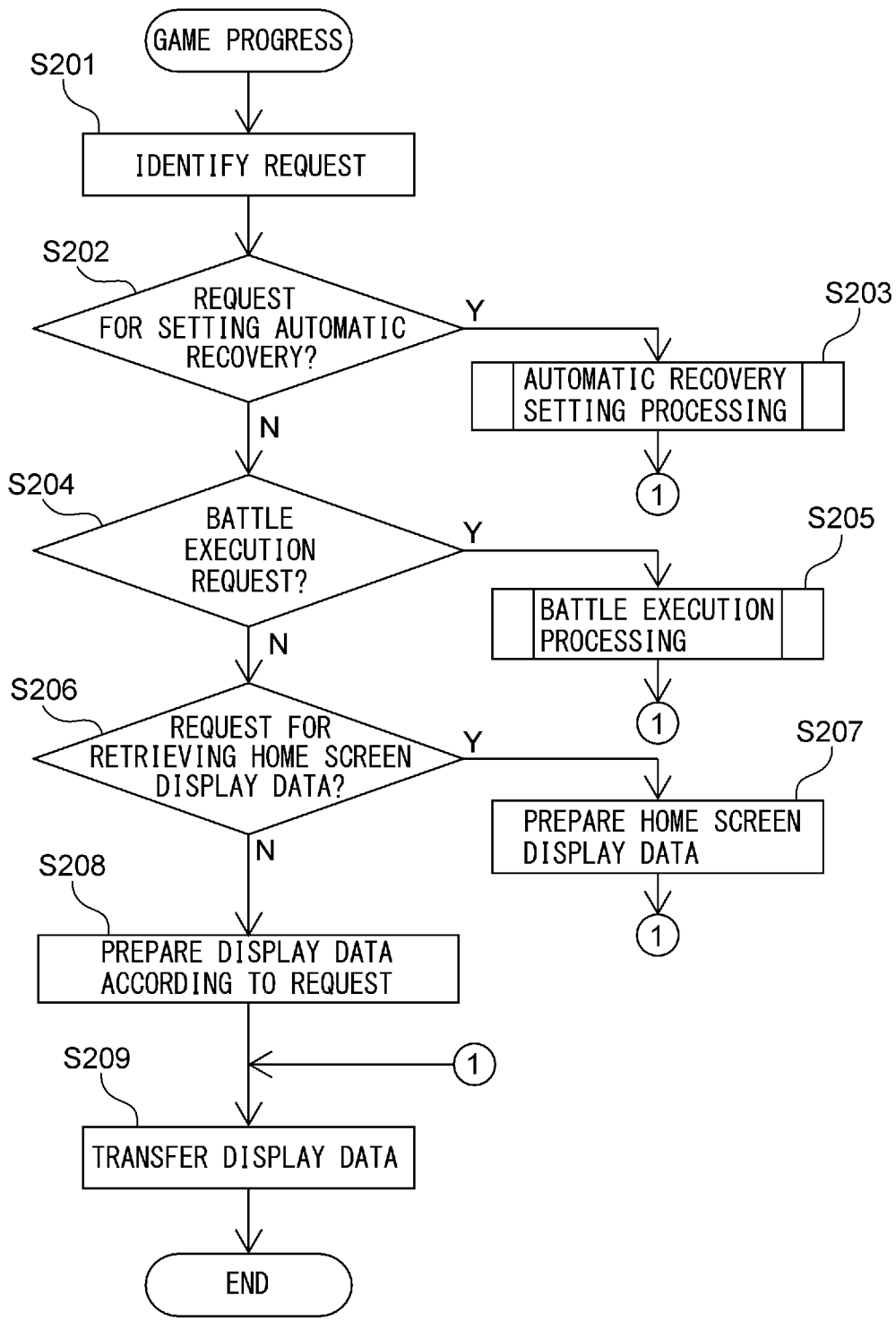
FIG. 9 is a view illustrating one example of an operation flow of game progress processing executed by the server 3.

FIG. 9 is a view illustrating one example of an operation flow of game progress processing executed by game progress module 333. The game progress processing illustrated in FIG. 9 is executed in step S107 of FIG. 8.

Initially, the game progress module 333 identifies a request of the portable device 2 from a request type included in the game progress request received from the control module 331 (step S201).

When the identified request is a request for setting automatic recovery of a battle point (step S202—Yes), the game progress module 333 instructs the automatic recovery setting module 335 to set automatic recovery of the battle point and then the automatic recovery setting module 335 executes automatic recovery setting processing (step S203). In the automatic recovery setting processing, the automatic recovery setting module 335 prepares the screen display data for setting automatic recovery of a battle point and transfers the prepared display data to the game progress module 333. Details of the automatic recovery setting processing will be described later.

Then, the game progress module 333 transfers the screen display data for setting automatic recovery of a battle point to the control module 331 (step S209) and then a series of steps ends.

On the other hand, when the request identified in step S201 is an execution request for a battle (step S202—No, step S204—Yes), the game progress module 333 instructs the event executing module 336 to execute the battle, and then the event executing module 336 executes execution processing of the battle (step S205). In the execution processing of the battle, the event executing module 336 prepares the battle execution screen display data and the battle result screen display data and transfers the prepared display data to the game progress module 333. Details of the execution processing of a battle will be described later.

Then, the game progress module 333 transfers the battle execution screen display data and the battle result screen display data received from the event executing module 336 to the control module 331 (step S209), and then a series of steps ends.

On the other hand, when the request identified in step S201 is a retrieving request of home screen display data (step S204—No, step S206—Yes), the game progress module 333 instructs the game start module 332 to prepare home screen display data. The game start module 332 prepares the home screen display data and transfers the prepared display data to the game progress module 333 (step S207).

Then, the game progress module 333 transfers the home screen display data received from the game start module 332 to the control module 331 (step S209), and then a series of steps ends.

On the other hand, when the request identified in step S201 is not any one of the above requests, i.e., is a retrieving request of display data of each screen other than the home screen display data (step S206—No), the game progress module 333 instructs the display data preparation module 334 to prepare display data of each screen. The display data preparation module 334 prepares display data of the specified screen and transfers the prepared display data to the game progress module 333 (step S208).

Then, the game progress module 333 transfers the received screen display data to the control module 331 (step S209), and then a series of steps ends.

Figure 10:
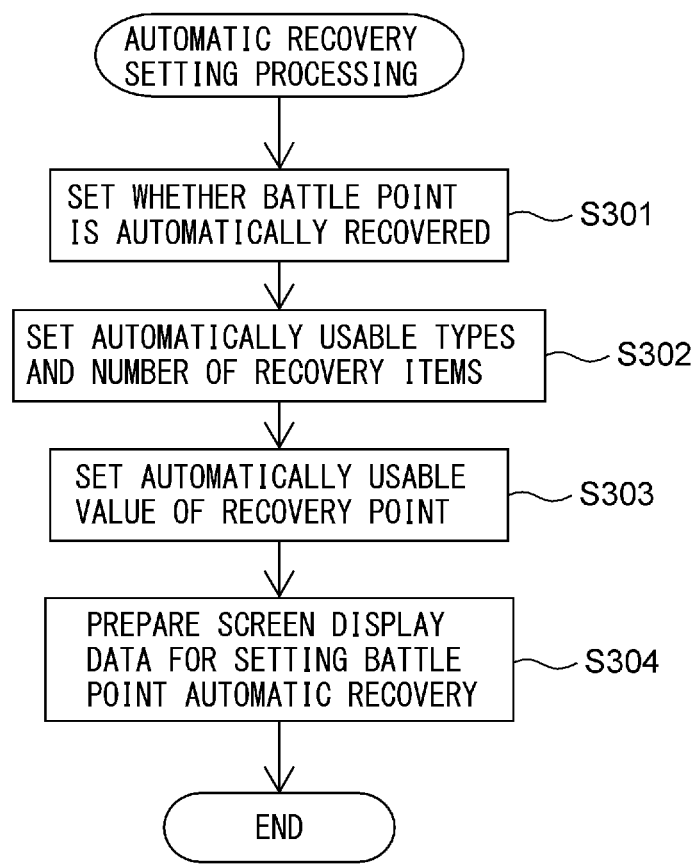
FIG. 10 is a view illustrating one example of an operation flow of automatic recovery setting processing executed by the server 3.

FIG. 10 is a view illustrating one example of an operation flow of automatic recovery setting processing executed by the automatic recovery setting module 335. The automatic recovery setting processing illustrated in FIG. 10 is executed in step S203 of FIG. 9.

Initially, the automatic recovery setting module 335 sets automatic recovery setting in the player management table in accordance with setting whether automatic recovery is executed included in a request for setting automatic recovery (step S301).

Then, the automatic recovery setting module 335 sets an automatically usable number for each recovery item of an automatically usable type in the player management table in accordance with setting of the automatically usable types and number of recovery items included in the request for setting automatic recovery (step S302).

Then, the automatic recovery setting module 335 sets an automatically usable value of a recovery point in the player management table in accordance with setting of the automatically usable value of a recovery point included in the request for setting automatic recovery (step S303).

Then, the automatic recovery setting module 335 prepares the screen display data for setting automatic recovery of a battle point and transfer the prepared display data to the game progress module 333 (step S304), and then a series of steps ends.

FIG. 11 is a view illustrating one example of an operation flow of battle execution processing executed by the event executing module 336, the automatic recovery module 337, and the reward giving module 338. Battle execution processing illustrated in FIG. 11 is executed in step S205 of FIG. 9.

Initially, the event executing module 336 determines whether a current battle point of a player of the portable device 2 is at least a consumption point number of a card used in a battle (step S401).

When the battle point is at least the consumption point number (step S401—Yes), the event executing module 336 moves the processing to step S412. On the other hand, when the battle point is less than the consumption point number (step S401—No), the automatic recovery module 337 determines whether automatic recovery setting of the battle point is valid (step S402).

When the automatic recovery setting of the battle point is invalid (step S402—No), the automatic recovery module 337 does not recover automatically the battle point but prepares battle result screen display data for displaying a battle point deficiency and transfers the prepared display data to the game progress module 333 (step S403), and then a series of steps ends.

On the other hand, when the automatic recovery setting of the battle point is valid (step S402—Yes), the automatic recovery module 337 determines whether a possessed number of recovery items of an automatically usable type is at least a needed number for recovering a deficient battle point (step S404).

When the possessed number of recovery items of an automatically usable type is at least the needed number (step S404—Yes), the automatic recovery module 337 determines whether a used number of the recovery items exceeds an automatically usable number (step S405).

When the used number of the recovery items is at most the automatically usable number (step S405—No), the automatic recovery module 337 moves the processing to step S409. On the other hand, when the used number of the recovery items exceeds the automatically usable number (step S405—Yes), the automatic recovery module 337 does not recover automatically the battle point but prepares battle result screen display data for displaying a battle point deficiency and transfers the prepared display data to the game progress module 333 (step S403), and then a series of steps ends.

On the other hand, when the possessed number of recovery items of an automatically usable type is less than the needed number (step S404—No), the automatic recovery module 337 determines whether a possessed value of a recovery point is at least a needed value for retrieving a necessary recovery item (step S406).

When the possessed value of the recovery point is less than the needed value (step S406—No), the automatic recovery module 337 does not recover automatically the battle point but prepares battle result screen display data for displaying a battle point deficiency and transfers the prepared display data to the game progress module 333 (step S403), and then a series of steps ends.

On the other hand, when the possessed value of the recovery point is at least the needed value (step S406—Yes), the automatic recovery module 337 determines whether a used value of the recovery point exceeds an automatically usable value (step S407).

When the used value of the recovery point exceeds the automatically usable value (step S407—Yes), the automatic recovery module 337 does not recover automatically the battle point but prepares battle result screen display data for displaying a battle point deficiency and transfers the prepared display data to the game progress module 333 (step S403).

On the other hand, when the used value of the recovery point is at most the automatically usable value (step S407—No), the automatic recovery module 337 replaces the recovery point with a recovery item (step S408) and moves the processing to step S409.

In step S409, the automatic recovery module 337 recovers the battle point (step S409).

Then, the reward giving module 338 determines whether the number of times of automatic recoveries is at least a predetermined number of times (step S410).

When the number of times of automatic recoveries is less than the predetermined number of times (step S410—No), the reward giving module 338 does not execute processing specifically but moves the processing to step S412. On the other hand, when the number of times of automatic recoveries is at least the predetermined number of times (step S410—Yes), the reward giving module 338 gives a reward to the player (step S411) and moves the processing to step S412.

In step S412, the event executing module 336 executes a battle (step S412).

Then, the event executing module 336 consumes a consumption point number from the battle point (step S413).

Then, the event executing module 336 prepares battle execution screen display data and battle result screen display data for displaying a performance image and a result content of the battle, respectively, and transfers the prepared display data to the game progress module 333 (step S414), and then a series of steps ends.

As having been described above, when a battle point has been less than a predetermined value, the server 3 automatically recovers the battle point by using a recovery point or a recovery item possessed by a player. Thereby, it is possible to prevent the progress of a game from being interrupted and to continually motivate the player of the game.

This application is not limited to the present embodiment. For example, the present embodiment has described an example in which an event of a game provided by the server 3 is a battle, but the event may also be a quest progressed according to a scenario of a game. The quest is generally referred also to as a search, a mission, or the like and provided with a plurality of stages to be cleared by a battle, retrieving of an item, and the like. A player can grow a character and acquire a reward such as a specific item and the like by executing a quest.

In this case, the server storage module 32 stores, also regarding a quest, a card ID of a card to be used, information on a quest point that is a possessed point for executing the quest, automatic recovery setting, information on a recovery item, and the number of times of automatic recoveries, in the same manner as respective pieces of information regarding a battle. Information on a recovery point is managed for a battle and a quest in common. The home screen displays a "quest point automatic recovery setting" button in the same manner as for the "battle point automatic recovery setting" button. When the "quest point automatic recovery setting" button is tapped, a screen for setting automatic recovery of a quest point for executing setting automatic recovery of a quest point similar to the screen for setting automatic recovery of a battle point is displayed. When an instruction for executing a quest is issued from a quest start screen, the event executing module 336 executes the quest under a condition where the quest point is at least a predetermined value and also consumes the predetermined value from the quest point. When the quest point has been less than the predetermined value, the automatic recovery module 337 automatically recovers the quest point by using a recovery point or a recovery item of the quest point. The predetermined value to be consumed is assumed to be a consumption point number of a card of a character used in a quest in the same manner as in a battle. When no card of a character is used in a quest, a predetermined value to be consumed may be set according to a difficulty level of the quest. Alternatively, the predetermined value to be consumed may be a fixed value.

Further, upon inclusion of both a battle and a quest in an event of a game, when a possessed point of one of a battle point and a quest point is automatically recovered, the automatic recovery module 337 may recover automatically a possessed point of the other one in conjunction of the battle point and the quest point. In this case, only when, for example, one possessed point is automatically recovered at a predetermined number of times or more or a win is realized via random number generation processing or the like, the other possessed point may also be recovered automatically. Further, it is possible that a recovery rate or a recovery amount of a possessed point of a side to be recovered in conjunction is smaller than a recovery rate or a recovery amount of a possessed point of a side recovered first. Thereby, automatic recovery of a possessed point becomes attractive to the player and then a usage rate of an automatic recovery function can be increased.

Further, in the present embodiment, automatic recovery setting was executed from any one of the home screen and the battle start screen, but any one of the screens is omissible.

Further, in the present embodiment, the server 3 executed a game, but the portable device 2 may control a game without the server 3. In this case, the device storage module 22 stores information on a player of the portable device 2 among pieces of information in a player management table, a card management table, and the like, and the device processing module 25 includes each module having the same function as each corresponding module of the server processing module 33 of the server 3, in addition to the modules illustrated in FIG. 2. The device processing module 25 transmits and receives each information item within the device processing module 25, instead of transmission/reception via the device communication module 21 and the server communication module 31.

It should be understood by those skilled in the art that various changes, substitutions, and modifications may be added to this application without departing from the spirit and scope of this application.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A game control method executed by a game control device for providing a game over a communication network to a plurality of communication terminals used by a plurality of players, respectively, the game control device communicating with the communication terminals and having a storage module, the method comprising:

storing, in the storage module, a plurality of game points possessed by the plurality of players for executing a battle including an attack by a first player and an attack by a second player associated with the first player in the game, or a quest progressed according to a scenario of the game and a plurality of recovery items possessed by respective players for recovering respective game points;

executing the battle or quest when a first game point possessed by the first player is more than or equal to a predetermined consumption value and deducting the predetermined consumption value from the first game point, according to a request from a communication terminal used by the first player;

automatically recovering the first game point by using a first recovery item possessed by the first player without the execution of the battle or quest by the first player, when the first game point is less than the predetermined consumption value and a used number of the recovery items used by the first player for recovering the first game point is less than or equal to a usable number of the recovery items that can automatically be used by the first player; and transmitting a message to the communication terminal used by the first player about not being able to automatically recover the first game point without an automatic recovery of the first game point, when the used number of the recovery item exceeds the usable number.

2. The game control method according to claim 1 further comprising:

receiving a setting as to whether the first game point is automatically recovered, the setting being executed by the first player; and automatically recovering the first game point only when automatic recovery of the first game point is set.

3. The game control method according to claim 1 further comprising:

receiving a setting of an automatically usable number or automatically usable types of the recovery items, the setting being executed by the first player; and using only the automatically usable number or types of the recovery items in order to automatically recover the first game point.

4. The game control method according to claim 1 further comprising giving a reward to the first player according to a number of times of automatic recoveries of the first game point.

5. The game control method according to claim 1 further comprising changing a recovery rate or a recovery amount of the first game point according to a number of times of automatic recoveries of the first game point.

6. The game control method according to claim 1 further comprising changing the predetermined consumption value to be consumed according to a number of times of automatic recoveries of the first game point.

7. The game control method according to claim 1 further comprising setting a recovery rate or a recovery amount upon automatically recovering the first game point to be larger than a recovery rate or a recovery amount upon recovering the first game point in accordance with an instruction of the first player.

8. The game control method according to claim 1 further comprising:

storing another player associated with the first player; and upon automatically recovering the first game point, automatically recovering also a game point of the another player associated with the first player.

9. The game control method according to claim 8, wherein the another player associated with the first player is another player belonging to the same group as the first player, another player having a friend status with the first player, or another player having helped the first player in a past battle or quest.

10. The game control method according to claim 1, wherein the game control device executes both the battle and the quest, and the first game point for executing one of the battle or the quest is also automatically recovered upon automatically recovering the first game point for executing other one of the battle or the quest.

11. The game control method according to claim 1 further comprising setting a number of times for automatically recovering the first game point according to an attribute of a game content used in the battle or the quest possessed by the first player.

12. The game control method according to claim 1 further comprising setting a number of times for automatically recovering the first game point according to a difficulty level of the battle or the quest.

13. A game control device for providing a game over a communication network to a plurality of communication terminals used by a plurality of players, respectively, the game control device communicating with the communication terminals, the game control device comprising:

a storage module for storing a plurality of game points possessed by the plurality of players for executing a battle including an attack by a first player and an attack by a second player associated with the first player in the game, or a quest progressed according to a scenario of the game and a plurality of recovery items possessed by respective players for recovering respective game points;

an event executing module for executing the battle or quest when a first game point possessed by the first player is more than or equal to a predetermined consumption value and deducting the predetermined consumption value from the first game point, according to a request from a communication terminal used by the first player; and an automatic recovery module for automatically recovering the first game point by using a first recovery item possessed by the first player without the execution of the battle or quest by the first player, when the first game point is less than the predetermined consumption value and a used number of the recovery items used by the first player for recovering the first game point is less than or equal to a usable number of the recovery items that can automatically be used by the first player, and transmitting a message to the communication terminal used by the first player about not being able to automatically recover the first game point without an automatic recovery of the first game point, when the used number of the recovery item exceeds the usable number.

14. A computer-readable, non-transitory medium storing a computer program, wherein the computer program causes game control device for providing a game over a communication network to a plurality of communication terminals used by a plurality of players, respectively, the game control device communicating with the communication terminals and having a storage module, to execute a process, the process comprising:

storing, in the storage module, a plurality of game points possessed by the plurality of players for executing a battle including an attack by a first player and an attack by a second player associated with the first player in the game, or a quest progressed according to a scenario of the game and a plurality of recovery items possessed by respective players for recovering respective game points;

executing the battle or quest when a first game point possessed by the first player is more than or equal to a predetermined consumption value and deducting the predetermined consumption value from the first game point, according to a request from a communication terminal used by the first player;

automatically recovering the first game point by using a first recovery item possessed by the first player without the execution of the battle or quest by the first player, when the first game point is less than the predetermined consumption value and a used number of the recovery items used by the first player for recovering the first game point is less than or equal to a usable number of the recovery items that can automatically be used by the first player; and transmitting a message to the communication terminal used by the first player about not being able to automatically recover the first game point without an automatic recovery of the first game point, when the used number of the recovery item exceeds the usable number.

* * * * *